United States Patent
Yoshinaga et al.

(10) Patent No.: US 7,833,313 B2
(45) Date of Patent: Nov. 16, 2010

(54) METHOD FOR MANUFACTURING POLYIMIDE ASYMMETRIC MEMBRANE, AND POLYIMIDE ASYMMETRIC MEMBRANE

(75) Inventors: Toshimune Yoshinaga, Chiba (JP); Kenji Fukunaga, Chiba (JP); Yoji Kase, Chiba (JP)

(73) Assignee: Ube Industries, Ltd., Yamaguchi (JP)

(*) Notice: Subject to any disclaimer, the term of this patent is extended or adjusted under 35 U.S.C. 154(b) by 0 days.

(21) Appl. No.: 12/606,768

(22) Filed: Oct. 27, 2009

(65) Prior Publication Data

US 2010/0116131 A1    May 13, 2010

Related U.S. Application Data

(62) Division of application No. 11/335,481, filed on Jan. 20, 2006, now Pat. No. 7,628,841.

(30) Foreign Application Priority Data

Jan. 21, 2005 (JP) .............................. 2005-014498

(51) Int. Cl.
- *B01D 53/22* (2006.01)
- *B01D 71/64* (2006.01)
- *D01F 6/94* (2006.01)
- *C01B 3/56* (2006.01)
- *C01B 23/00* (2006.01)

(52) U.S. Cl. .................. 95/53; 95/45; 95/47; 95/50; 96/11; 96/12; 96/13; 96/14; 210/500.39; 428/473.5; 525/432; 525/436

(58) Field of Classification Search ............ 95/45, 95/47, 50, 53; 96/11, 12, 13, 14; 210/500.39; 428/473.5; 525/432, 436
See application file for complete search history.

(56) References Cited

U.S. PATENT DOCUMENTS

| 5,055,116 A | 10/1991 | Kohn et al. |
| 5,391,219 A * | 2/1995 | Matsumoto et al. ............ 95/51 |

FOREIGN PATENT DOCUMENTS

| JP | 6-269650 | 9/1994 |
| JP | 8-052332 | 2/1996 |
| JP | 2003-024755 | 1/2003 |

* cited by examiner

*Primary Examiner*—Ana L Woodward
(74) *Attorney, Agent, or Firm*—Young & Thompson

(57) ABSTRACT

A process of producing an asymmetric membrane of multicomponent polyimide. The process includes the steps of (1) preparing a multicomponent polyimide blend solution by mixing a polyimide component A having a number-averaged polymerization index $N_A$ and a polyimide component B having a number-averaged polymerization index $N_B$, wherein $N_A$ and $N_B$ satisfies equation 1:

$$2.35 \times N_A^{-2.09} < N_B < 450 \times N_A^{-1.12} \qquad 1$$

(2) subjecting the multicomponent polyimide blend solution to further polymerization and imidation reaction, and (3) causing a phase inversion in the resulting multicomponent polyimide blend solution to form an asymmetric membrane. The polyimide component A is raw materials of polyimide A containing a fluorine atom in the chemical structure thereof and/or a polymerization and imidation reaction product of the raw materials. The polyimide component B is raw materials of polyimide B and/or a polymerization and imidation reaction product of the raw materials.

5 Claims, 3 Drawing Sheets

Surface of a membrane

METHOD FOR MANUFACTURING POLYIMIDE ASYMMETRIC MEMBRANE, AND POLYIMIDE ASYMMETRIC MEMBRANE

BACKGROUND OF THE INVENTION

1. Field of the Invention

This invention relates to a process of producing a polyimide asymmetric membrane having a dense layer and a porous layer. More particularly, it relates to a process of producing a polyimide asymmetric membrane made of multi-component polyimide containing a fluorine-containing polyimide and having a controlled composition of the fluorine-containing polyimide in its dense layer. The process of the invention provides a practical high-performance gas separation membrane.

2. Description of the Related Art

Gas separation membranes are made use of in industrial gas separation processing. Above all, gas separation membranes made of polyimide with high permselectivity (permeance ratio) are used. Generally speaking, polyimide has high permselectivity (permeance ratio) but low permeability (permeability coefficient). Hence, a gas separation membrane made of polyimide has an asymmetric structure composed of a porous layer primarily performing a mechanical supporting function and a dense layer primarily performing a separation function, with the thickness of the dense layer, where permeate gas undergoes permeation resistance, reduced so as to secure a gas permeation rate.

A gas separation membrane for practical use is required to have not only gas permeation characteristics including gas permselectivity and permeation rate but other characteristics such as mechanical strength. In the case of polyimide derived solely from one tetracarboxylic acid component and one diamine component (i.e., homopolyimide), these characteristics are determined by the combination of the tetracarboxylic acid component and the diamine component. In order to realize a gas separation membrane fulfilling these requirements for practical use, studies of gas separation membranes have been directed to use of copolyimide obtained by replacing part of the tetracarboxylic acid component and/or the diamine component with other tetracarboxylic acid component and/or other diamine component. Characteristics of gas separation membranes made of such copolyimide depend on the composition of two or more tetracarboxylic acid components and/or two or more diamine components. Through the studies, polyimides prepared using a fluorine-containing tetracarboxylic acid component or a fluorine-containing diamine component have often been used for the purpose of improving gas permeation characteristics, particularly permeation rate.

In general, nevertheless, an asymmetric membrane formed of a polyimide with excellent gas permeation characteristics, such as a fluorine-containing polyimide, has insufficient mechanical strength, while an asymmetric membrane formed of a polyimide with high mechanical strength exhibits insufficient gas permeation characteristics.

JP-A-6-269650 discloses a composite gas separation membrane having a laminate structure comprising (a) a porous polyacrylonitrile structural support material, (b) a gutter layer comprising a crosslinked polar phenyl-containing-organopolysiloxane material, and (c) an ultrathin selective membrane layer comprising a specific fluorine-containing polyimide.

JP-A-8-52332 discloses a composite gas separation membrane comprising an aliphatic porous polyimide supporting layer and a fluorine-containing polyimide thin layer laminated thereon.

Making such a composite membrane involves forming a uniform thin layer on a porous layer. However, it is not easy to uniformly form a thin layer on a porous layer. In fact, it is not easy even with the processes taught in the above references to obtain a high performance gas separation membrane.

Japanese Patent Application No. 2003-24755 discloses a process of producing an asymmetric hollow fiber separation membrane by phase inversion method using a polymer blend solution containing two kinds of polyimides. The reference does not mention production of an asymmetric membrane using a blend solution containing a copolymer having "blockness" that is obtained by preparing a blend solution containing polyimide components having specific polymerization indexes and further subjecting the blend solution to polymerization and imidation.

SUMMARY OF THE INVENTION

An object of the present invention is to provide a process of producing a polyimide asymmetric membrane comprising multicomponent polyimide containing a fluorine-containing polyimide and having a controlled composition of the fluorine-containing polyimide in a dense layer thereof.

Another object of the present invention is to provide a polyimide asymmetric membrane containing a fluorine-containing polyimide in a dense layer thereof in a suitably controlled composition.

The present invention relates to a process of producing an asymmetric membrane of multi-component polyimide. The process includes (1) preparing a multi-component polyimide blend solution by mixing a polyimide component A and a polyimide component B, the polyimide component A being raw materials of a polyimide A containing a fluorine atom in the chemical structure thereof and/or a polymerization and imidation reaction product of the raw materials, the polyimide component B being raw materials of a polyimide B and/or a polymerization and imidation reaction product of the raw materials, the number-averaged polymerization index of the polyimide component A taken as $N_A$ and the number-averaged polymerization index of the polyimide component B taken as $N_B$ satisfying equation 1:

$$2.35 \times N_A^{-2.09} < N_B < 450 \times N_A^{-1.12} \qquad 1$$

(2) subjecting the multi-component polyimide blend solution to further polymerization and imidation reaction, and (3) causing a phase inversion in the resulting multi-component polyimide blend solution to form an asymmetric membrane.

The present invention also relates to a polyimide asymmetric membrane having a dense layer and a porous layer. The polyimide asymmetric membrane comprises a multi-component polyimide containing a fluorine-containing polyimide. The ratio of the dense layer's fluorine atom concentration ($\Phi_s$), measured by X-ray photoelectron spectroscopy (XPS), to the overall average fluorine atom concentration (f) of the membrane, $\Phi_s/f$, ranges from 1.1 to 1.8.

The present invention also relates to a method of separating and recovering at least one kind of gas from a gas mixture. The method comprises feeding the gas mixture to a feed side of the polyimide asymmetric gas separation membrane of the present invention and selectively permeating at least one component of gas of the gas mixture through the gas separation membrane to a permeate side.

The present invention provides a polyimide asymmetric membrane having a dense layer and a porous layer, comprising a multi-component polyimide containing a fluorine-containing polyimide, with the fluorine-containing polyimide content in the dense layer suitably controlled.

The polyimide asymmetric membrane of the invention is suitable as a practical high-performance gas separation membrane with which separation between hydrogen gas and a hydrocarbon gas, e.g., methane gas, separation between hydrogen gas and nitrogen gas, separation between helium gas and nitrogen gas, separation between carbonic acid gas and methane gas, separation between oxygen gas and nitrogen gas, and the like can be accomplished advantageously.

DESCRIPTION OF THE PREFERRED EMBODIMENTS

Figure 1:
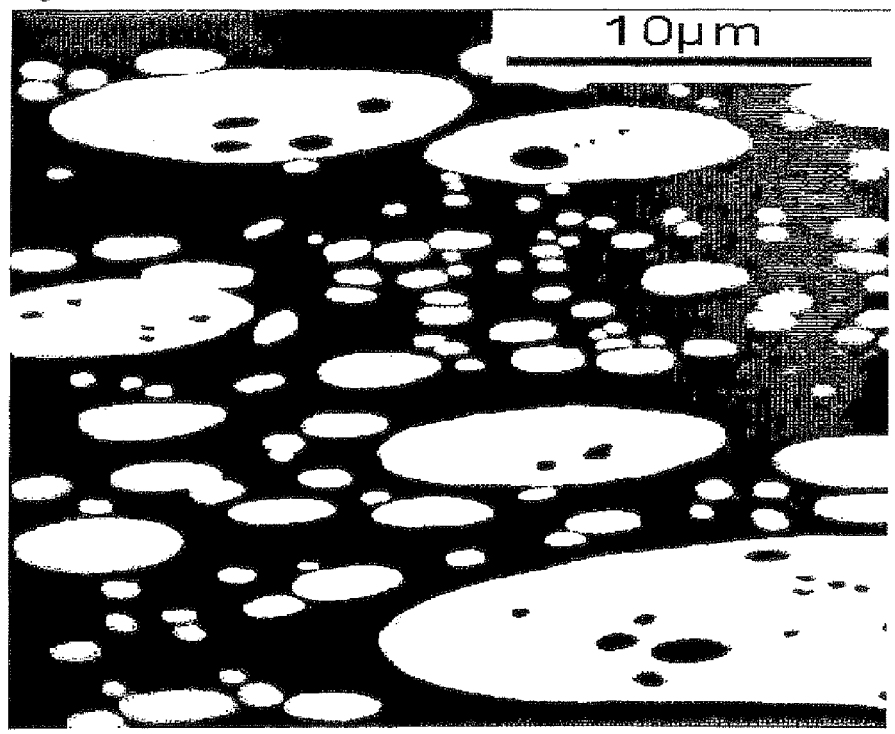
FIG. 1 presents a TEM image of a cross section of a film in which macrophase-separation has occurred. The film was obtained by casting a polyimide blend solution of two high-molecular-weight polyimides (Comparative Example 5) on a glass plate, followed by drying.

The polyimide asymmetric membrane of the present invention will be described with particular reference to its application as a high-performance gas separation membrane, but it should be noted that the application of the polyimide asymmetric membrane of the invention is not limited thereto. The terminology "polyimide component" as used herein means a component comprising raw materials of polyimide (an unreacted tetracarboxylic acid component and an unreacted diamine component) and/or a polymerization and imidation reaction product of the raw materials. The terminology "polymerization and imidation reaction product" as used herein does not necessarily means a polymer having a high polymerization index but includes a monomer and an oligomer having a low polymerization index which are produced in the initial stage of the polymerization and imidation reaction. Therefore, the polymerization and imidation reaction product is a mixture of a monomer (i.e., an equimolecular imidation product between a tetracarboxylic acid component and a diamine component) and/or a polymer (i.e., an imidation product of more than 2 molecules, in total, of a tetracarboxylic acid component and a diamine component).

The polymerization index of a polymerization and imidation reaction product, as referred to in the invention, is defined to be the number of repeating units in a polyimide present in the product. A monomer has a polymerization index of 1, and a polymer has a polymerization index >1. On the other hand, the polymerization index of each raw material of polyimide, having no repeating unit, is defined to be 0.5. A number-averaged polymerization index is calculated on the basis of the above-defined polymerization indexes.

The polyimide component A comprises raw materials of a polyimide A (i.e., an unreacted tetracarboxylic acid component and an unreacted diamine component) and/or a polymerization and imidation reaction product of the raw materials. The polyimide component B comprises raw materials of polyimide B (i.e., an unreacted tetracarboxylic acid component and an unreacted diamine component) and/or a polymerization and imidation reaction product of the raw materials.

If the polyimide components A and B in both of which the tetracarboxylic acid component and the diamine component are in their unreacted state (both having a polymerization index of 0.5) are mixed and subjected to polymerization and imidation reaction, there is produced a polyimide mainly comprising a random copolymer in which the polyimide components A and B are bonded with considerable randomness. When subjected to phase inversion method, such a polyimide is capable of forming an asymmetric membrane composed of a dense layer and a porous layer but incapable of preferentially segregating a fluorine-containing polyimide to the dense layer, namely incapable of providing a gas separation membrane exhibiting excellent gas permeation characteristics and satisfactory mechanical characteristics. The reason is due to the conflicting relationship: polyimide with high gas permeation characteristics has poor mechanical strength, whilst polyimide with satisfactory mechanical strength has poor gas permeation characteristics.

Figure 3:
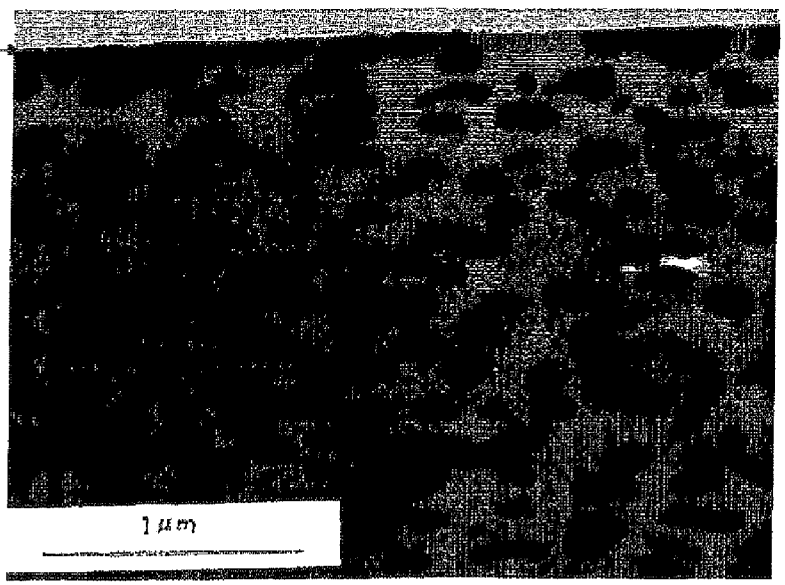
FIG. 3 shows a TEM image taken of a cross section of another film in which macrophase-separation has occurred. The film was obtained by casting a blend solution of two high-molecular-weight polyimides on a glass plate, followed by drying. The TEM image gives better understanding of macrophase-separated structure near the film surface.

If the polyimide component A and the polyimide component B are separately polymerized and imidated, and the resulting polyimides A and B both having a high polymerization index are blended, it is usually hard to prepare a uniform solution of the blend. A uniform solution of the blend could be prepared and remain nearly uniform for a very short time, but it is not easy to maintain the uniformity for a long time enough to carry out phase inversion to produce an asymmetric membrane in a stable manner. Where a blend solution containing polyimides having high polymerization indexes is phase inverted, the solution undergoes rapid progress of macrophase-separation induced by repulsive interaction between the different polyimides due to differences, even if slight differences present, in chemical properties. The terminology "macrophase-separation" denotes phase separation of different components of polyimides resulting in forming a macrophase-separated structure containing domains of 0.1 µm or greater, not infrequently of 1 µm or greater, in size comprising different components. A transmission electron microscope (TEM) image of an example of such a macrophase-separated structure is presented in FIG. 1. Another example is shown in FIG. 3. Clearly distinguished domains of different components in a macrophase-separated structure is observed in the TEM images. If macrophase-separation occurs, the dense layer will suffer from serious disturbances, resulting in a failure to provide an asymmetric membrane having good separation capabilities. An asymmetric membrane prepared by a dry/wet spinning process often has a thickness of about 1 to 1000 nm in its dense layer. In case of occurrence of macrophase-separation, the dense layer will have polyimide A-rich domains and polyimide B-rich domains, which is demonstrated in FIG. 3. In other words, when viewed in an in-plane direction, the dense layer is macroscopically non-uniform, being composed of domains of different component. As a result, an asymmetric membrane with satisfactory separation capabilities cannot be obtained.

Figure 2:
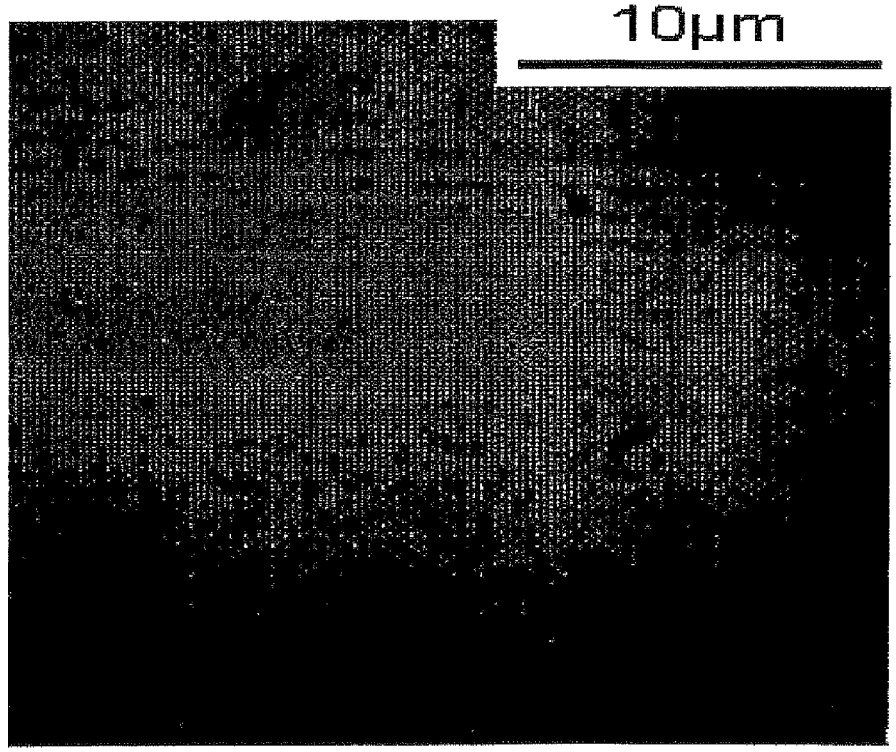
FIG. 2 presents a TEM image of a cross section of a film in which macrophase-separation has not occurred. The film was obtained by casting a multi-component polyimide blend solution of the invention (Example 4) on a glass plate, followed by drying.

The present invention provides a process of producing an asymmetric membrane characterized in that a solution of a multi-component polyimide having a prescribed polymerization index and containing a block copolymer is prepared and that the multi-component polyimide blend solution is subjected to phase inversion. When the multi-component polyimide blend solution of the invention is used in a phase inversion process, phase separation which can be seen as microphase-separation proceeds without being accompanied by macrophase-separation. A TEM image representing an example of such a microphase-separated structure is shown in FIG. 2, in which no phase separated structure containing domains of different components (i.e., macrophase separation) is observed. Although it is considered that there are fine domains of about several nanometers to about 0.1 μm, the boundaries of the domains are unclear when seen as a whole, presenting a structure containing lots of vague regions where different polyimides are not completely phase-separated. In the pathway of this phase separation, there is formed a multi-component polyimide layer containing a higher fraction of fluorine-containing polyimide in the dense layer when seen in a cross-sectional direction of the membrane (a direction perpendicular to the surface of the membrane) as described later. Involvement of macroscopic disturbances in polyimide composition in an in-plane direction of the membrane (a direction parallel to the surface of the membrane) is averted. That is, the present invention provides a process of producing an improved multi-component polyimide asymmetric membrane in which the dense layer and the porous layer are different in chemical and physical properties with no variations nor reductions in separation capabilities that would accompany the progress of macrophase-separation. This can be achieved by causing a microphase-separation between different polyimides in a controlled manner so as to prevent the phase separation from attaining macrophase-separation.

The process of producing a multi-component polyimide asymmetric membrane according to the present invention includes the following steps (1) to (3), in which a "polyimide component A" is raw materials of a polyimide A containing a fluorine atom in the chemical structure thereof and/or a polymerization and imidation reaction product of the raw materials; a "polyimide component B" is raw materials of a polyimide B and/or a polymerization and imidation reaction product of the raw materials; the number-averaged polymerization index of the polyimide component A is taken as $N_A$; and the number-averaged polymerization index of the polyimide component B is taken as $N_B$.

Step 1: A polyimide component A and a polyimide component B are mixed to prepare a multi-component polyimide blend solution, the polyimide component A and the polyimide component B being so combined as to satisfy equation 1:

$$2.35 \times N_A^{-2.09} < N_B < 450 \times N_A^{-1.12} \quad (1)$$

Step 2: The multicomponent polyimide blend solution is subjected to further polymerization and imidation reaction.

Step 3: An asymmetric membrane is formed by a phase inversion method using the resulting multi-component polyimide blend solution.

The polyimide A containing a fluorine atom in the chemical structure thereof is a polyimide derived from raw materials, i.e., a tetracarboxylic acid component and a diamine component, at least one of which contains a fluorine atom.

Suitable raw materials for polyimide A are those producing polyimide A with high gas permeation rate and high gas selectivity. Particularly suitable are those producing a polyimide A having, in the form of a uniform film, a helium gas permeability coefficient ($P_{He}$) of $5 \times 10^{-10}$ cm$^3$(STP)·cm/cm$^2$·sec·cmHg or greater and a helium to nitrogen gas permeance ratio ($P_{He}/P_{N2}$) of 20 or greater as measured at 80° C., preferably a helium gas permeability coefficient ($P_{He}$) of $2.5 \times 10^{-9}$ cm$^3$(STP)·cm/cm$^2$·sec·cmHg or greater and a helium to nitrogen gas permeance ratio ($P_{He}/P_{N2}$) of 20 or greater as measured at 80° C., more preferably a helium gas permeability coefficient ($P_{He}$) of $3 \times 10^{-9}$ cm$^3$(STP)·cm/cm$^2$·sec·cmHg or greater and a helium to nitrogen gas permeance ratio ($P_{He}/P_{N2}$) of 30 or greater as measured at 80° C. Containing fluorine, the polyimide A exhibits higher solubility in various solvents commonly used in a phase inversion process and having smaller surface free energy as compared with polyimide containing no fluorine.

A lower $P_{He}$ or a lower $P_{He}/P_{N2}$ than the respective recited ranges results in insufficient gas selectivity (permeance ratio) and permeation rate of the resulting asymmetric gas separation membrane. The above-recited ranges are therefore appropriate.

Fluorine-containing tetracarboxylic acid components for making a polyimide A include, but are not limited to, 2,2-bis(3,4-dicarboxyphenyl)hexafluoropropane, 2,2'-bis(trifluoromethyl)-4,4',5,5'-biphenyltetracarboxylic acid, 4,4'-(hexafluorotrimethylene)diphthalic acid, 4,4'-(octafluorotetramethylene)diphthalic acid, and their dianhydride and esters. Preferred of them are 2,2-bis(3,4-dicarboxyphenyl)hexafluoropropane and its dianhydride (hereinafter sometimes abbreviated as 6FDA) and esters.

Fluorine-containing diamine components for making a polyimide A include, but are not limited to, 2,2-bis(4-aminophenyl)hexafluoropropane, 2,2'-bis(trifluoromethyl)-4,4'-diaminobiphenyl, 2,2-bis[4-(4-aminophenoxy)phenyl]hexafluoropropane, and 2-trifluoromethyl-p-phenylenediamine.

These fluorine-containing raw materials may be used either individually or as a mixture of two or more thereof or in combination with a fluorine-free monomer component. It is preferred that either the tetracarboxylic acid component or the diamine component contains a fluorine-containing raw material in a major fraction (i.e., a molar composition of 50 mol % or more, usually 55 mol % or more).

Where a fluorine-containing tetracarboxylic acid component is a major tetracarboxylic acid component to make polyimide A, the diamine component that can be used in combination includes aromatic diamines, such as p-phenylenediamine, m-phenylenediamine (hereinafter sometimes abbreviated as MPD), 4,4'-diaminodiphenyl ether (hereinafter sometimes abbreviated as DADE), 4,4'-diaminodiphenylmethane, 3,3'-dimethyl-4,4'-diaminodiphenylmethane, 3,3',5,5'-tetramethyl-4,4'-diaminodiphenylmethane, 3,3'-dichloro-4,4'-diaminodiphenylmethane, dimethyl-3,7-diaminodibenzothiophene 5,5-dioxide (hereinafter sometimes abbreviated as TSN; TSN is usually available in the form of a mixture having 2,8-dimethyl-3,7-diaminodibenzothiophene 5,5-dioxide as a main component and containing isomers with a methyl group(s) bonded at different positions, e.g., 2,6-dimethyl-3,7-diaminodibenzothiophene 5,5-dioxide and 4,6-dimethyl-3,7-diaminodibenzothiophene 5,5-dioxide), 2,2-bis[4-(4-aminophenoxy)phenyl]propane, 3,3'-dihydroxy-4,4'-diaminodiphenyl, 3,3'-dicarboxy-4,4'-diaminodiphenyl, 3,3'-dicarboxy-4,4'-diaminodiphenylmethane, 3,3',5,5'-tetrachloro-4,4'-diaminodiphenyl, diaminonaphthalene, 2,4-dimethyl-m-phenylenediamine, 3,5- diaminobenzoic acid (hereinafter sometimes abbreviated as DABA), and 3,3'-diaminodiphenylsulfone (hereinafter sometimes abbreviated as MASN). Where 6FDA or its derivative is used as a major tetracarboxylic acid component, particularly preferred diamines to be combined with of the above-enumerated aromatic diamines are those having an amino group at the meta-position, such as DABA, MASN, and MPD.

Tetracarboxylic acid components that can be combined with a fluorine-containing diamine component for making polyimide A include, but are not limited to, pyromellitic acid, benzophenonetetracarboxylic acid, naphthalenetetracarboxylic acid, bis(dicarboxyphenyl) ether, bis(dicarboxyphenyl) sulfone, 2,2-bis(dicarboxyphenyl)propane, 2,3,3',4'-biphenyltetracarboxylic acid, 2,2',3,3'-biphenyltetracarboxylic acid, 3,3',4,4'-biphenyltetracarboxylic acid, and their anhydride and esters. Particularly preferred of them is 3,3',4,4'-biphenyltetracarboxylic acid dianhydride (hereinafter sometimes abbreviated as s-BPDA).

Suitable raw materials for a polyimide B are such that a film obtained from the resulting polyimide B has a tensile strength of 100 MPa or more, preferably 150 MPa or more, and a tensile elongation at break of 10% or more, preferably 15% or more. With the tensile strength less than 100 MPa or the tensile elongation at break less than 10%, an asymmetric membrane obtained using such polyimide has insufficient mechanical strength and ductility for practical use, failing to be fabricated into gas separation modules or failing to be suited to applications using high pressure gas. Therefore, the above-recited ranges are appropriate.

Since polyimide having a fluorine atom in the chemical structure thereof has relatively low mechanical strength, it is preferred for both the monomer components providing polyimide B, i.e., a tetracarboxylic acid component and a diamine component, not to contain a fluorine-containing component in a major fraction. It is more preferred for both the monomer components to be free of fluorine.

Tetracarboxylic acid components of a polyimide B include, but are not limited to, pyromellitic acid, benzophenonetetracarboxylic acid, naphthalenetetracarboxylic acid, bis(dicarboxyphenyl) ether, bis(dicarboxyphenyl) sulfone, 2,2-bis(dicarboxyphenyl)propane, 2,3,3',4'-biphenyltetracarboxylic acid, 2,2',3,3'-biphenyltetracarboxylic acid, 3,3',4,4'-biphenyltetracarboxylic acid, and their anhydride and esters. Particularly preferred of them is 3,3',4,4'-biphenyltetracarboxylic acid dianhydride.

These tetracarboxylic acid components can be used either individually or as a mixture of two or more thereof or in combination with a small amount of a fluorine-containing tetracarboxylic acid component. For example, it is acceptable that one mole of s-BPDA is combined with not more than 0.3 moles of 6FDA.

Suitable diamine components of a polyimide B include those listed above as diamine components that can be combined with 6FDA as a major tetracarboxylic acid component of polyimide A.

Figure 4:
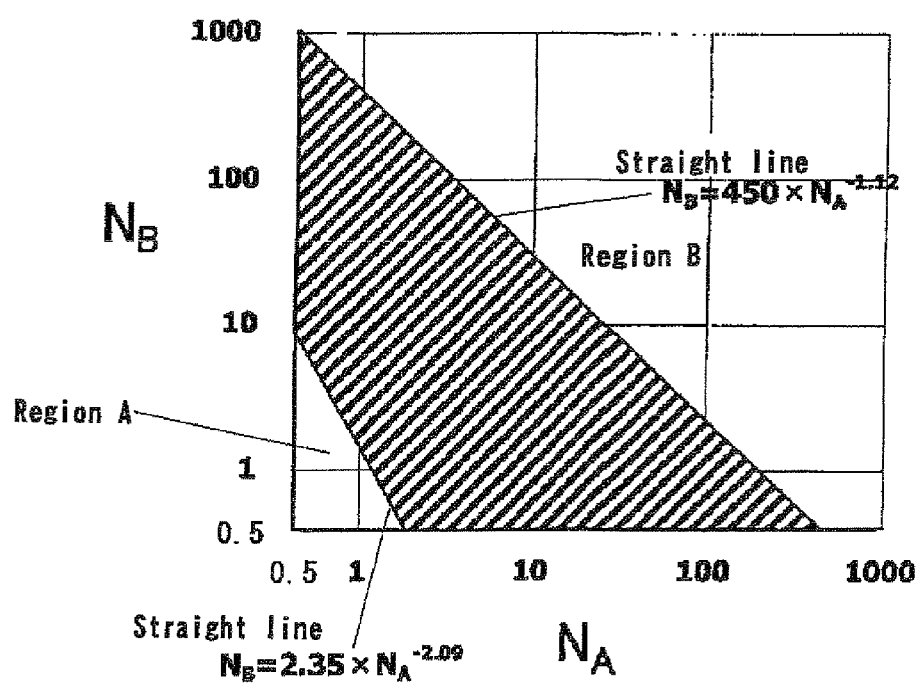
FIG. 4 is a graph illustrative of the combination range of $N_A$ and $N_B$ in the invention.

In step 1 of the process of the invention, a multi-component polyimide blend solution is prepared by mixing (i) a polyimide component A having a number-averaged polymerization index $N_A$ and comprising raw materials of a polyimide A containing a fluorine atom in the chemical structure thereof and/or a polymerization and imidation reaction product of the raw materials and (ii) a polyimide component B having a number-averaged polymerization index $N_B$ and comprising raw materials of a polyimide B and/or a polymerization and imidation reaction product of the raw materials. The $N_A$ and $N_B$ satisfy equation 1. In FIG. 4, the range of the $N_A/N_B$ combination that satisfies equation 1 is graphically shown as a shaded region. The polymerization index of the polyimide raw materials (i.e., unreacted tetracarboxylic acid component(s) and unreacted diamine component(s)) being defined to be 0.5, $N_A$ and $N_B$ are at least 0.5.

In step 2, the multicomponent polyimide blend solution is subjected to further polymerization and imidation reaction to give a mixture containing the polyimide component A and the polyimide component B both having been further polymerized and imidated. The result is a multi-component polyimide blend solution containing at least a polymer from the polyimide A component and a polymer from the polyimide B component. The blend solution additionally contains a di- or multi-block copolymer having the polyimide component A and the polyimide component B bonded to each other at their ends and has acquired an appropriate polymerization index.

The term "diblock copolymer" denotes a copolymer consisting of one block composed of a polyimide component A and one block composed of a polyimide component B joined end-to-end. The term "multi-block copolymer" denotes a copolymer consisting of the diblock copolymer and at least one block of either kind bonded to one or both ends of the diblock copolymer. The di- or multi-block copolymer can contain a chain of blocks of a polyimide component A or a chain of blocks of a polyimide component B.

The description goes into further detail by referring to FIG. 4.

If polyimide components A and B whose $N_A$ and $N_B$ are in region A in the graph of FIG. 4 are mixed in step 1, and the resulting multi-component polyimide blend solution is polymerized and imidated in step 2, neither blocks consisting solely of the polyimide component A nor blocks consisting solely of the polyimide component B are formed, and the result is a copolymer having the polyimide components A and B distributed with high randomness.

If polyimide components A and B whose $N_A$ and $N_B$ are in region B in the graph of FIG. 4 are mixed in step 1, and the resulting multi-component polyimide blend solution is polymerized and imidated in step 2, a multi-component polyimide blend solution containing a block copolymer could be obtained. However, because of too high the polymerization index of the block copolymer, strong repulsive interactions between the polyimide blocks easily result in macrophase-separation. Therefore, $N_A$ and $N_B$ combinations in regions A and B in FIG. 4 fail to provide the asymmetric membrane of the present invention.

Within the $N_A$ and $N_B$ combination range satisfying equation 1 (the shaded region in the graph of FIG. 4), there is obtained a multi-component polyimide blend solution containing at least a polymer from the polyimide A component, a polymer from the polyimide B component and, in addition, a di- or multi-block copolymer having the one block composed of polyimide component A and the one block composed of polyimide component B bonded end-to-end and, as a whole, having an appropriate polymerization index. It is possible with the resulting multi-component polyimide to achieve controlled phase separation, what we may call microphase-separation, while inhibiting macrophase-separation that might be caused by repulsive interactions.

Step 1 is the step in which a polyimide component A comprising raw materials of a polyimide A containing a fluorine atom in the chemical structure thereof and/or a polymerization and imidation reaction product of the raw materials and a polyimide component B comprising raw materials of a polyimide B and/or a polymerization and imidation reaction product of the raw materials, the number-averaged polymerization index of the polyimide component A ($N_A$) and the number-averaged polymerization index of the polyimide component B ($N_B$) satisfying equation 1, are mixed to prepare a multicomponent polyimide blend solution. The manner of effecting step 1 is not particularly limited as long as a multi-component polyimide blend solution is obtained. For example, raw materials of a polyimide A and raw materials of a polyimide B are separately prepared, if necessary by polymerization and imidation reaction. They are uniformly mixed to obtain a multi-component polyimide blend solution. When either one of the polyimide components is a mixture of raw materials (i.e., an unreacted tetracarboxylic acid component and an unreacted diamine component), the raw materials of the other polyimide component can be polymerized and imidated to prepare a polyimide solution having a prescribed number-averaged polymerization index. To the polyimide solution are added the unreacted tetracarboxylic acid component and the unreacted diamine component as the first mentioned polyimide component to give a multicomponent polyimide blend solution. Considering that a polyimide B having a higher polymerization index is more advantageous to improve the mechanical strength of an asymmetric membrane, it is advantageous that the raw materials of a polyimide B are polymerized and imidated in a polar solvent to prepare a polyimide B with an appropriate polymerization index, into which the raw materials of a polyimide A are mixed to prepare a multi-component polyimide blend solution in step 1.

Polymerization and imidation reaction for obtaining polyimide is described below. Polymerization and imidation reaction is carried out conveniently by allowing a tetracarboxylic acid component and a diamine component to react at a predetermined ratio in a polar solvent at 120° C. or higher, preferably 160° C. or higher, and not higher than the boiling point of the solvent, whereby polyamic acid is formed, followed by dehydration and ring closure to form an imide group. In order to achieve a prescribed polymerization index, the reaction temperature may be lowered than the recited range. Because a residual amic acid group can undergo exchange reaction to impair the blockness of polyimide, the polymerization and imidation reaction is preferably carried out to achieve an imidation ratio of at least 50%, more preferably until imidation substantially completes.

The polymerization and imidation reaction between a tetracarboxylic acid component and a diamine component at a ratio close to 1 results in synthesis of polyimide with a relatively high molecular weight (a high number-averaged polymerization index). Hence, when a polyimide having a relatively high molecular weight from the beginning is desired, it is preferred to cause a tetracarboxylic acid component and a diamine component to react at a molar ratio of 1:0.95 to 0.99 or 1:1.005 to 1.05, more preferably 1:0.98 to 0.995 or 1:1.005 to 1.02, to obtain a polyimide component having a relatively high molecular weight.

In the case of, for example, 6FDA as a tetracarboxylic acid component and TSN as a diamine component, dehydration and ring closure reaction using 1.02 moles of TSN per mole of 6FDA at 190° C. for 30 hours results in synthesis of a polyimide having a number-averaged molecular weight of about 15000 to 25000 (corresponding to a number-averaged polymerization index of about 20 to 40); and dehydration and ring closure reaction using 1.005 moles of TSN per mole of 6FDA at 190° C. for 30 hours results in synthesis of a polyimide having a number-averaged molecular weight of about 30000 to 40000 (corresponding to a number-averaged polymerization index of about 40 to 60).

In another example, where 6FDA and DABA are used as a tetracarboxylic acid component and a diamine component, respectively, dehydration and ring closure reaction using 1.02 moles of DABA per mole of 6FDA at 190° C. for 30 hours results in synthesis of a polyimide having a number-averaged molecular weight of about 15000 to 25000 (corresponding to a number-averaged polymerization index of about 25 to 45); and dehydration and ring closure reaction using 1.005 moles of DABA per mole of 6FDA at 190° C. for 30 hours results in synthesis of polyimide having a number-averaged molecular weight of about 40000 to 50000 (corresponding to a number-averaged polymerization index of about 70 to 90).

On the other hand, reaction between 1 mol of a tetracarboxylic acid component and 0.98 mol or less or 1.02 mol or more of a diamine component results in formation of a polyimide component tailored to have a relatively low molecular weight (a small number-averaged polymerization index).

The multi-component polyimide blend solution obtained in step 1 preferably has a total diamine component to total tetracarboxylic acid component molar ratio (total number of moles of a diamine components)/total number of moles of a tetracarboxylic acid component(s)) ranging from 0.95 to 0.99 or from 1.01 to 1.05, more preferably from 0.96 to 0.99 or from 1.015 to 1.04. The recited total diamine component to total tetracarboxylic acid component molar ratio is advantageous for obtaining a multi-component polyimide blend solution with an appropriate number-averaged molecular weight or solution viscosity in step 2.

Step 2 is the step of subjecting the multi-component polyimide blend solution obtained in step 1, which contains the polyimide A component and polyimide B component whose $N_A$ and $N_B$ satisfy equation 1, to further polymerization and imidation reaction to prepare a blend solution of a multi-component polyimide containing at least a polymer from the polyimide A component, a polymer from the polyimide B component and, in addition, a di- or multi-block copolymer having the one block composed of polyimide component A and the one block composed of polyimide component B bonded end-to-end and, as a whole, having an appropriate polymerization index.

Step 2 consists in subjecting the multi-component polyimide blend solution obtained in step 1 to further polymerization and imidation reaction. The above-described method for polymerization and imidation can be adopted as appropriate.

A polar solvent capable of uniformly dissolving multi-component polyimide is used in the multi-component polyimide blend solutions prepared in steps 1 and 2. The expression "uniformly dissolving" as used herein means that the solvent is capable of providing a solution free from macrophase-separated domains large enough to scatter visible light and free from apparently obvious turbidity. The solution may contain microphase-separated domains of sizes not so large as to cause visible light scattering. The solution is not indispensably required to be uniform on the molecular chain level.

If a solvent used is such that the multi-component polyimide solution develops apparently obvious turbidity after the preparation, a gas separation membrane having high gas treating performance as aimed in the invention cannot be obtained.

Suitable polar solvents include, but are not limited to, phenol-based solvents, such as phenols, e.g., phenol, cresol, and xylenol, catechols having two hydroxyl groups on a benzene ring, and halogenated phenols, e.g., 3-chlorophenol, 4-chlorophenol (hereinafter sometimes abbreviated as PCP), 4-bromophenol, and 2-chloro-5-hydroxytoluene; amide solvents, such as N-methyl-2-pyrrolidone, N,N-dimethylformamide, N,N-dimethylacetamide, and N,N-diethylacetamide; and mixtures thereof.

The manner of the polymerization and imidation reaction in step 2 is not particularly restricted as long as the reaction results in formation of a di- or multi-block copolymer having the one block composed of polyimide component A and one block composed of polyimide component B joined end-to-end. Usually, formation of the di- or multi-block copolymer can conveniently be accomplished by conducting polymerization and imidation until the multi-component polyimide blend solution increases its number-averaged molecular weight preferably twice or more, more preferably five times or more. The multi-component polyimide blend solution resulting from the polymerization and imidation reaction of step 2 suitably has a number-averaged polymerization index of 20 to 1000, preferably 20 to 500, more preferably 30 to 200. A blend solution with too small a number-averaged polymerization index has too low a solution viscosity, which makes film formation in step 3 difficult, and the resulting asymmetric membrane has reduced mechanical strength. A blend solution with too large a number-averaged polymerization index is liable to macrophase separation and has too high a solution viscosity, which also makes film formation in step 3 difficult. The solution viscosity (rotational viscosity) of the multicomponent polyimide blend solution obtained in step 2 is a characteristic requirement for shaping the solution into a prescribed form (e.g., a hollow fiber form) and for stabilizing the form as shaped in the formation of an asymmetric membrane by phase inversion. In the present invention, it is advisable to adjust the solution viscosity of the multicomponent polyimide blend solution in a range of 20 to 17000 poise, preferably 100 to 15000 poise, more preferably 200 to 10000 poise, at 100° C. A polyimide solution having a solution viscosity falling within the recited range can be, for example, spun through a spinneret into a desired shape such as a hollow fiber in a stable manner in a spinning procedure in the manufacture of hollow fiber asymmetric membrane. With a solution viscosity lower than 20 poise or higher than 17000 poise, the solution has difficulty in stabilizing the shape as extruded, such as a hollow fiber geometry.

A multicomponent polyimide blend solution having an appropriate number-averaged polymerization index and solution viscosity can easily be obtained by (1) preparing a multi-component polyimide blend solution having a total diamine component to total tetracarboxylic acid component molar ratio (total number of moles of a diamine component(s)/total number of moles of a tetracarboxylic acid component(s)) ranging from 0.95 to 0.99 or from 1.01 to 1.05, more preferably from 0.96 to 0.99 or from 1.015 to 1.04 in step 1 and (2) further polymerizing and imidating the resulting blend solution in step 2.

It is preferred that the amount of the solvent in the multi-component polyimide blend solutions of steps 1 and 2 be adjusted to give a polymer concentration of 5% to 40% by weight, preferably 8% to 25% by weight, more preferably 9% to 20% by weight. At a polymer concentration lower than 5% by weight, the solution is liable to produce an asymmetric membrane with defects in a phase inversion process, which, when used as a gas separation membrane, has poor gas permeation performance. At a polymer concentration exceeding 40% by weight, the resulting asymmetric membrane tends to have a reduced rate of gas permeation due to an increased thickness in its dense layer or a reduced porosity in its porous layer. As far as the use as a gas separation membrane is concerned, it is difficult to obtain a satisfactory asymmetric membrane from such a solution.

Step 3 is characterized in that an asymmetric membrane is formed by phase inversion of the multi-component polyimide blend solution obtained in step 2. A phase inversion process is a known film formation technique in which a polymer solution is brought into contact with a coagulation bath to cause phase inversion. In the present invention, what we call a dry/wet process is conveniently employed. The dry/wet process, which was proposed by Loeb, et al. (see, e.g., U.S. Pat. No. 3,133,132), involves forming a polymer solution into film, evaporating the solvent from the film of the polymer solution, which can lead to the development of a dense layer, then immersing the film into a coagulating bath (a solvent miscible with the solvent of the polymer solution and incapable of dissolving the polymer) to induce phase separation thereby to form fine pores, which can lead to the formation of a porous layer. In step 3 according to the present invention, macrophase-separation is suppressed, and microphase separation is allowed to proceed to form a polyimide asymmetric membrane having a properly controlled composition of the fluorine-containing polyimide in its dense layer.

The asymmetric hollow fiber membrane of the invention can be conveniently produced by adopting a dry/wet spinning process to carrying out step 3. The dry/wet spinning process is application of the aforementioned dry/wet phase inversion process to a polymer solution having been extruded through a spinneret into a hollow fiber geometry to manufacture an asymmetric hollow fiber membrane. More specifically, a polymer solution is forced through a spinneret into a hollow fiber geometry. Immediately thereafter, the extruded hollow fibers are passed through an air or nitrogen gas atmosphere and then immersed in a coagulation bath substantially incapable of dissolving the polymer components and compatible with the solvent of the polymer blend solution to form an asymmetric structure. Subsequently, the hollow fibers are dried and, if desired, heat treated to make a separation membrane.

In order to stably maintain the shape (e.g., hollow fiber) immediately after the extrusion, the multi-component polyimide blend solution to be extruded through the spinneret preferably has a solution viscosity of 20 to 17000 poise, more preferably 100 to 15000 poise, even more preferably 200 to 10000 poise, at the spinning temperature (e.g., 100° C.) as previously stated. Coagulation is preferably carried by first immersion in a first coagulation bath where the membrane is coagulated to an extent enough to retain its shape (e.g., hollow fiber), taking up the membrane by a guide roll, and second immersion in a second coagulating bath where the membrane is thoroughly coagulated. Drying of the coagulated membrane is efficiently conducted by replacing the coagulating liquid with a solvent such as a hydrocarbon prior to drying. The heat treatment, if performed, is preferably at a temperature lower than the softening point or the secondary transition point of every polymer constituting the multi-component polyimide.

The multi-component polyimide blend solution used in step 3 of the invention is a blend solution of a multi-component polyimide having an appropriate polymerization index and containing at least a polymer from the polyimide A component, a polymer from the polyimide B component and, in addition, a di- or multi-block copolymer having the polyimide component A and the polyimide component B bonded end-to-end, as obtained by the polymerization and imidation reaction in step 2.

While the blend solution undergoes phase separation in the phase separation membrane formation, the di- or multi-block copolymer having the polyimide component A and the polyimide component B bonded end-to-end functions as a kind of a surfactant between the polymer of the polyimide component A and the polymer of the polyimide component B, which are incompatible to each other. To put it differently, the di- or multi-block copolymer is segregated to the interface between the domains made of the polyimide component A and the domains of the polyimide component B to block the repulsive interactions between the different domains. In this way, the di- or multi-block copolymer allows desirable microphase-separation to proceed while suppressing macrophase-separation.

Fluorine-containing polyimide is considered to hardly precipitate in the dense layer in the asymmetric membrane formation by phase inversion because it is generally more soluble than fluorine-free polyimide. Nonetheless, because fluorine-containing polyimide has a low surface free energy, it is thermodynamically concentrated on the membrane surface thereby to reduce the enthalpy of the membrane surface. Fluorine-containing polyimide's existing in the dense layer in a higher fraction is assumed attributed to this thermodynamic effect.

The asymmetric membrane obtained by the invention is a polyimide asymmetric membrane having a dense layer and a porous layer. It comprises multi-component polyimide containing a fluorine-containing polyimide, with the fluorine-containing polyimide existing in the dense layer in a higher composition. That is, the asymmetric membrane contains a fluorine-containing polyimide having relatively good permeation characteristics in a high fraction in the dense layer required to have high permeation performance as a gas separation membrane, while containing a to polyimide having no or little fluorine content and therefore exhibiting relatively high mechanical strength in the porous layer. Therefore, the asymmetric membrane of the invention is extremely well suited for use as a gas separation membrane. Seeing that the polyimide compositions vary in the thickness direction, the asymmetric membrane can be said to have a gradient structure.

Figure 5:
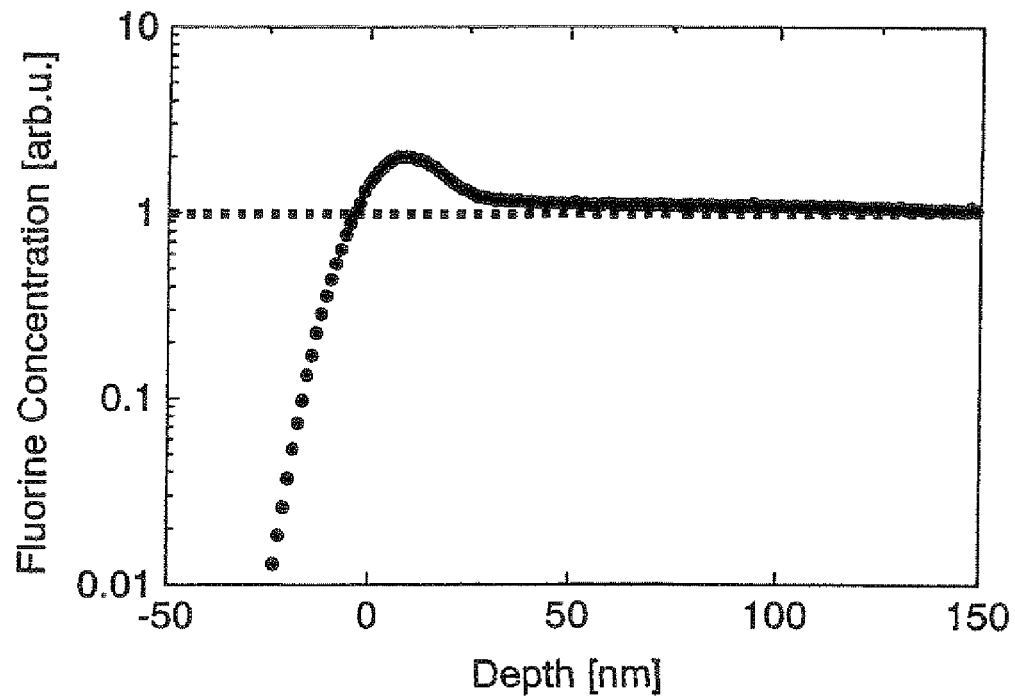
FIG. 5 is the results of dSIMS analysis for fluorine in the thickness direction of a film obtained by casting a multi-component polyimide blend solution of the invention (Example 4) on a glass substrate, followed by drying.

The gradient structure can be ascertained through dynamic secondary ion mass spectrometry (hereinafter abbreviated as dSIMS). dSIMS is a technique for elemental depth profiling, in which an $O_2^+$ ion beam is used to sputter species from the membrane surface, and the secondary ions sputtered at various depths are mass analyzed. FIG. 5 is the results of depth profiling (Atomica Dynamic SIMS4000; $O_2^+$ ion bombardment current: 15 nA/μm$^2$) of fluorine concentration in a uniform film from the surface to the inside, the film formed by casting a multi-component polyimide blend solution containing a di- or multi-block copolymer and having an appropriate polymerization index that was prepared by the process of the invention on a glass substrate and drying. In FIG. 5, the abscissa represents a depth from the sample surface, the depth being calculated from the time of sputtering and the average rate of etching previously determined based on the time required for sputter etching a deuterated polystyrene cover layer provided on the surface of the sample with a known thickness. In the plots of the fluorine concentrations at a depth 0 nm (surface) to 150 nm, a region with a high fluorine concentration is observed from the surface up to a depth of about 50 nm.

Figure 6:
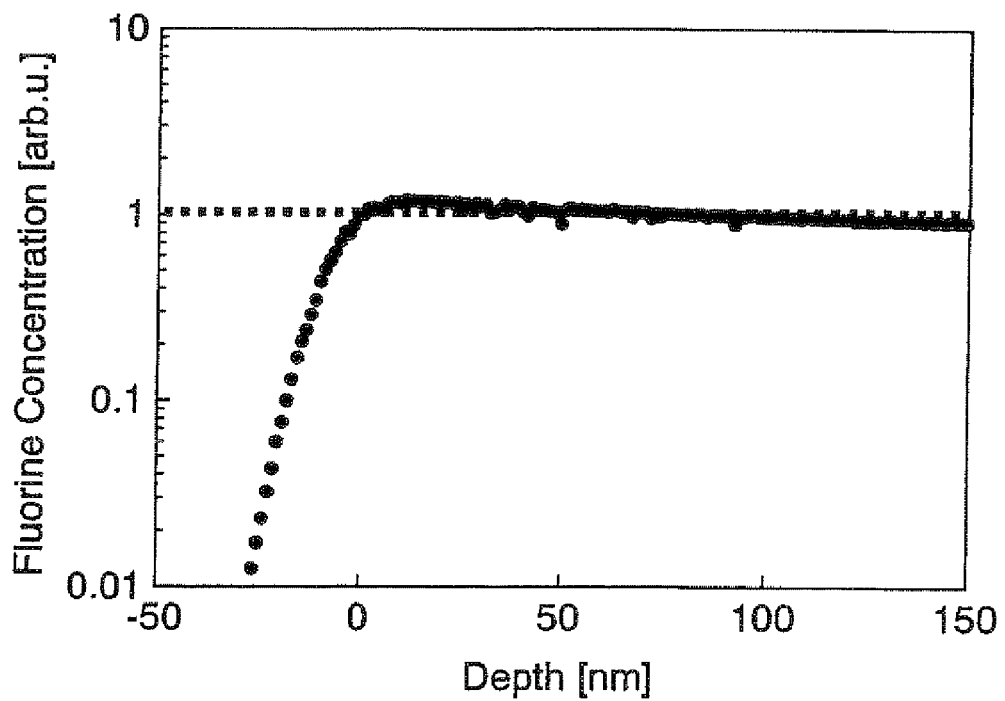
FIG. 6 is the results of dSIMS analysis for fluorine in the thickness direction of a film obtained by casting a polyimide solution prepared in a usual manner (Comparative Example 2) on a glass substrate, followed by drying.

The same analysis was conducted on a uniform film obtained, in contrast, by casting a polyimide dope solution prepared by a conventional polymerization process on a glass substrate and drying. The results are plotted in FIG. 6. There is observed no noticeable gradient structure in the fluorine distribution near the surface.

The polyimide asymmetric membrane according to the present invention preferably has a ratio of the fluorine atom concentration ($\Phi_s$) of the dense layer's surface, measured by X-ray photoelectron spectroscopy, to the average fluorine atom concentration (f) of the multi-component polyimide forming the membrane, $\Phi_s/f$, from 1.1 to 1.8.

When raw materials of the same composition as used to prepare the multi-component polyimide containing a fluorine-containing polyimide are polymerized and imidated in a usual manner to prepare a random copolyimide solution, which is then formed into a polyimide asymmetric membrane by the dry/wet processing, the resulting membrane has a fluorine atom concentration ratio $\Phi_s/f$ of about 1.0. In contrast, the polyimide asymmetric membrane of the invention has the fluorine-containing polyimide more distributed in the dense layer and preferably has a fluorine atom concentration ratio $\Phi_s/f$ of from 1.1 to 1.8, more preferably of from 1.2 to 1.7.

The polyimide asymmetric membrane used as a gas separation membrane has a dense layer and a porous layer. The dense layer has such denseness as to have substantially different permeation rates depending on gas species (for example, the helium to nitrogen gas permeation rate ratio is 1.2 or more at 50° C.) and therefore functions to separate gas species. On the other hand, the porous layer has such porosity as to have practically no gas separation functionality. The pore size is not necessarily uniform. The porous layer may have the pore size decreasing from its surface to the inside and may continuously lead to a dense layer. The polyimide asymmetric membrane of the invention has no defects in its dense layer and exhibits high gas separation performance. The asymmetric membrane is not limited in form, thickness, dimension, etc. and may be, for example, a flat film or a hollow fiber. For use as a gas separation membrane, a suitable thickness of the dense layer is about 1 to 1000 nm, preferably about 20 to 200 nm, and that of the porous layer is about 10 to 2000 μm, preferably about 10 to 500 μm. For use as a hollow fiber gas separation membrane, in particular, a suitable inner diameter is about 10 to 3000 μm, preferably about 20 to 900 μm, and a suitable outer diameter is about 30 to 7000 μm, preferably about 50 to 1200 μm. A hollow fiber membrane is preferably an asymmetric hollow fiber membrane with the dense layer outside.

It is preferred for the polyimide asymmetric membrane obtained by the invention to have high gas separation performance and mechanical strength for practical use. Specifically, the hydrogen permeation rate ($P'_{H2}$) is preferably $4.0 \times 10^{-4}$ cm$^3$(STP)/cm$^2$·sec·cmHg or more, more preferably $5.0 \times 10^{-4}$ cm$^3$(STP)/cm$^2$·sec·cmHg or more. The ratio of the hydrogen gas permeation rate ($P'_{H2}$) to nitrogen gas permeation rate ($P'_{N2}$), $P'_{H2}/P'_{N2}$, is preferably 20 or greater, more preferably 45 or greater. The tensile elongation at break is 15% or more. In particular, a hollow fiber membrane has a tensile elongation at break of 15% or more. The helium gas permeation rate ($P'_{He}$) is preferably $4.0 \times 10^{-4}$ cm$^3$(STP)/cm$^2$·sec·cmHg or more, more preferably $5.0 \times 10^{-4}$ cm$^3$(STP)/cm$^2$·sec·cmHg or more. The ratio of the helium gas permeation rate ($P'_{He}$) to nitrogen gas permeation rate ($P'_{N2}$), $P'_{He}/P'_{N2}$, is preferably 20 or greater, more preferably 45 or greater. The tensile elongation at break is 15% or more. In particular, a hollow fiber membrane has a tensile elongation at break of 15% or more.

Where a hollow fiber has a tensile elongation at break of less than 15%, the hollow fiber membrane will easily cut or break when incorporated into a module. Due to a failure to fabricate a module on an industrial scale, such hollow fibers are impractical. Hollow fibers having a tensile elongation at break of 15% or more are easy to assemble into a module and therefore practical. Hollow fibers with a tensile elongation at break of less than 15% are also impractical in that they tend to cut while used (particularly with high pressure gas introduced) and hence must be used under limited conditions.

Accordingly, the asymmetric hollow fiber gas separation membrane of the present invention can conveniently be fabricated into a module in a conventional manner. An ordinary gas separation membrane module is formed as follows. About 100 to 200,000 hollow fiber membranes of appropriate length are bound into a bundle. The hollow fibers of the bundle are secured at both ends thereof with a tube sheet made of a thermoplastic resin, etc. to make a hollow fiber membrane element with both ends of the individual fibers open. The resulting hollow fiber membrane element is set in a container having at least a mixed gas inlet, a permeate outlet, and a retentate (non-permeate) outlet in such a manner that the space leading to the inside of the individual hollow fibers and the space leading to the outside of the hollow fibers are isolated from each other. A gas mixture is fed from the mixed gas inlet to the space in contact with the inside or outside of the hollow fiber membrane. While the mixed gas flows along the hollow fiber membrane, a specific component in the mixed gas selectively passes through the membrane. The permeate gas is discharged from the permeate outlet, while the retentate gas that has not passed through the membrane is discharged from the retentate outlet, thus accomplishing gas separation.

Seeing that the gas separation membrane comprising the polyimide asymmetric membrane of the invention is a practical high-performance gas separation membrane having excellent gas permeation characteristics and excellent mechanical strength as described above, it is useful for separation between hydrogen gas and a hydrocarbon gas such as methane, separation between hydrogen and nitrogen, separation between helium and nitrogen, separation between carbonic acid gas and a hydrocarbon gas such as methane, and separation between oxygen and nitrogen, and so forth. Inter alia, the gas separation membrane of the invention is well suited for separation between hydrogen gas and a hydrocarbon gas such as methane, separation between hydrogen gas and nitrogen gas, and separation between oxygen gas and nitrogen gas.

A polymerization index used in the present invention can be determined by previously examining the correlation between number-averaged polymerization index and solution viscosity by measuring an imidation ratio through gel-permeation chromatography (GPC) or infrared spectroscopy and measuring the solution viscosity of a reaction solution. GPC measurement was adopted for reaction solutions having an imidation ratio of 90% or higher, and infrared spectroscopy was used for those having an imidation ratio less than 90%.

GPC measurement was carried out as follows using an HPLC system of 800-series available from JASCO Corp. equipped with a Shodex KD-806M column (column temperature: 40° C.) and Intelligent UV/Vis detector (absorption wavelength: 350 nm) for unknown samples or a differential refractive index detector for standards (polyethylene glycol). N-Methyl-2-pyrrolidone containing 0.05 mol/l each of lithium chloride and phosphoric acid was used as a solvent. The flow rate of the solvent was 0.5 ml/min, and the sample concentration was about 0.1%. Data acquisition and processing are done by JASCO-JMBS/Bowrin software. Data was acquired twice a second to prepare a chromatogram of a sample. Polyethylene glycols having a molecular weight of 82, 250, 28, 700, 6, 450, 1, and 900 were used as standards to provide chromatograms, from which peaks were detected to prepare a calibration curve showing the relation between retention time and molecular weight. The molecular weight analysis of an unknown sample was performed as follows. Molecular weight $M_i$ at each retention time was obtained from the calibration curve, and the fraction of the height $h_i$ of the chromatogram at each retention time to the total height $(W_i=h_i/\Sigma h_i)$ was obtained. The number-averaged molecular weight Mn and weight-averaged molecular weight Mw of the sample are calculated from $1/[\Sigma(W_i/M_i)]$ and $\Sigma(W_i \cdot M_i)$, respectively.

The number-averaged polymerization index N was obtained by dividing the number-averaged molecular weight Mn by a monomer unit molecular weight <m> averaged according to the composition of the monomer components used to commence polymerization.

$$N=Mn/<m>$$

The monomer unit molecular weight <m> was obtained as follows. When a plurality of tetracarboxylic acid components (molecular weight: $m_{1,i}$; molar ratio: $R_{1,i}$; $\Sigma R_{1,i}=1$; i=1, 2, 3, ..., $n_1$) and a plurality of diamine components ((molecular weight: $m_{2,j}$; molar ratio: $R_{2,j}$; $\Sigma R_{2,j}=1$; j=1, 2, 3, ..., $n_2$) are charged, the monomer unit molecular weight <m> was calculated according to equation below.

$$<m>=(\Sigma R_{1,i}m_{1,i}+\Sigma R_{2,j}m_{2,j})-36$$

Imidation ratio measurement by infrared spectroscopy was performed by attenuated total reflection-Fourier transform infrared spectrometry (ATR-FTIR) on Spectrum-One FTIR spectrophotometer (Perkin Elmer). The absorbance A of C—N stretching vibration (wave number: about 1360 cm$^{-1}$) of an imide bond was standardized taking the absorbance $A_I$ of aromatic ring C═C in-plane vibration (wave number: about 1500 cm$^{-1}$) as an internal standard. The same sample was analyzed in the same manner after heat treatment at 190° C. for 5 hours, and the absorbance $A_S$ of C—N stretching vibration was standardized using the absorbance $A_{SI}$ of aromatic ring C═C in-plane vibration as an internal standard. The imidation ratio $p_I$ is calculated by dividing the former standardized value $(A/A_I)$ by the latter standardized value $(A_S/A_{SI})$.

$$p_I=(A/A_I)/(A_S/A_{SI})$$

The line connecting valleys on both sides of an absorption band was taken as a base line from which the peak intensity of absorbance was measured.

The number-averaged polymerization index N is calculated from the imidation ratio according to equation below.

$$N=(1+r)/(2r(1-p_I)+(1-r))$$

In the equation above, r is a compositional ratio of the total number of moles of a tetracarboxylic acid component(s) to the total number of moles of a diamine component(s) in a polyimide. Where a diamine component is more than a tetracarboxylic acid component, the reciprocal of the ratio is used as r. In either case, r is not greater than one. $p_I$ is an imidation ratio.

In the present invention, the composition of a fluorine-containing polyimide in the dense layer can be found by determining the fluorine atom concentration $\Phi_S$ in the dense layer's surface by X-ray photoelectron spectroscopy (XPS or ESCA).

An atomic concentration $\Phi_j$ of a specific element j is represented by equation:

$$\Phi_j=N_j/\Sigma N_i$$

where $N_i$ is the number of atoms of a detectable element contained in a polyimide (hydrogen and helium are undetectable); $N_j$ is the number of atoms of the specific element j (the subscript represents an element species); and $\Sigma N_i$ is the sum of the numbers of atoms of all the detectable elements in the polyimide.

XPS is carried out by irradiating the dense layer's surface of a polyimide asymmetric membrane with X-rays to emit electrons (called photoelectrons) from each orbital of each element contained in the polyimide into the vacuum, and measuring the intensity of the emitted photoelectrons versus the kinetic energy. In order to minimize damage to the polyimide surface, it is desirable to use monochromatized AlKα rays free from X-ray components unnecessary for XPS.

Binding energy $E_b$, of electrons in atoms in a substance is calculated from the photoelectron kinetic energy $E_k$ according to equation:

$$E_b = h\nu - E_k - W$$

where $h\nu$ is an incident energy of X-rays; and W is a work function of a spectrometer used to detect photoelectrons.

Since the binding energy depends almost entirely on the atom species and the electron orbital, detection of all elements should be possible theoretically only if the incident energy of X-rays is correctly chosen. In fact, however, hydrogen and helium cannot be detected because of the small probability of the electron on each orbital being excited by X-rays (photoionization cross section).

The intensity $I_j$ of the photoelectron emitted by X-ray bombardment from orbital l of specific element j present in polyimide is represented by equation:

$$I_j = N_j \sigma_j^l \lambda_j^l A_j^l R$$

where $N_j$ is the number of atoms of element j per unit volume; $\sigma_j^l$ is the l-shell photoionization cross section of element j; $\lambda_j^l$ is the mean-free-path for inelastic scattering of an electron emitted from l-shell of element j traveling in polyimide; $A_j^l$ is a function of an instrument on the electron emitted from l-shell of element j; and R is the surface roughness coefficient of a polyimide asymmetric membrane.

The photoionization cross section $\sigma_i^l$ and the mean-free-path for inelastic scattering $\lambda_j^l$ are known values. $A_j^l$ is a value decided from the instrument and measurement conditions. The value R varies from sample to sample but are cancelled by taking an intensity ratio and is therefore unnecessary in the calculations hereinafter described to obtain an atomic concentration.

In the present invention, the atomic concentration $\Phi_j$ of specific element j in polyimide was obtained using the measured photoelectron intensity $I_j$ in accordance with equation:

$$\Phi_j = (I_j/S_j)/\Sigma(I_i/S_i)$$

where $S_j = \sigma_j^l \lambda_j^l A_j^l$; $S_i$ represents relative sensitivity for element i; and $\Sigma(I_i/S_i)$ represents the sum of photoelectron intensities of all the detectable elements i present in polyimide divided by the respective relative sensitivities.

The relative sensitivity $S_j$ can be decided separately using a standard substance whose atomic concentration is known. While relative sensitivity $S'_j$ that is furnished by an XPS system manufacturer may be utilized for the sake of convenience, a relative sensitivity was decided in the present invention by using a polyimide having a single composition (i.e., a homopolyimide obtained from one tetracarboxylic acid component and one diamine component) the atomic concentration of which is known.

When a sample made of a polyimide having a single composition (i.e., a homopolyimide obtained from one tetracarboxylic acid component and one diamine component) is analyzed, it is expected that the surface atomic concentration $\Phi_{s,j}$ and the average atomic concentration $f_j$ are in substantial agreement. If a relative sensitivity $S'_j$ supplied by an XPS system manufacturer, etc., i.e., a relative sensitivity factor corrected by the instrumental function, is used as such in the measurement of surface atomic concentration $\Phi_{s,j}$, there is often disagreement between $\Phi_{s,j}$ and $f_j$. The disagreement is attributed to the fact that the relative sensitivity $S'_j$ is a value experimentally obtained using a standard substance other than polyimide. Therefore, the value $S'_j$ was corrected so that the surface atomic concentration $\Phi_{s,j}$ and the average atomic concentration $f_j$ of a sample made of a homopolyimide having a single composition may agree with each other, and the thus corrected value was used as relative sensitivity $S_j$ in the determination of a surface atomic concentration of a polyimide material. Namely, the relative sensitivity $S_j$ as used in the invention is represented by equation:

$$S_j = S'_j \times \alpha_j$$

where $\alpha_j$ is a correction factor for making a relative sensitivity $S'_j$ determined for element j by using other standard material than polyimide applicable to a polyimide material.

In the present invention, the correction factor was obtained for every element through measurements, and a relative sensitivity $S_j$ as corrected by the correction factor was used.

In the invention, the photoelectron intensity $I_j$ is obtained from the photoelectron peak area under the photoelectron spectrum measured by XPS. Of photoelectron peaks a peak for a transition with a relatively large photoionization cross section is preferably made use of. Usually, a photoelectron peak for a transition having a photoionization cross section 10% larger than that of the C 1s orbital is conveniently used. In the invention, a photoelectron peak from the 1s orbital is preferably made use of for fluorine. A photoelectron peak from the 1s orbital was preferably made use of for carbon; the 1s orbital for nitrogen; the 1s orbital for oxygen; and the 2p orbital for sulfur.

The photoelectron spectrum has a background due to inelastic scattering of photoelectrons when emitted from a sample into the vacuum. The background is subtracted from each photoelectron peak used to determine an atomic concentration to give a residual area as $I_j$.

When the asymmetric membrane to be XPS analyzed is a hollow fiber membrane, an X-ray probe size should be less than the hollow fiber diameter. The hollow fiber diameter being 30 μm or larger, generally about 100 μm or larger, a probe size of about 100 μm or smaller is suitably used. A probe size of about 20 μm is preferably used.

Because the polyimide surface is charged as photoelectrons are ejected, it is preferred to neutralize the surface charges by, for example, an electron beam.

In XPS measurement, the depth of measurement from the specimen surface varies depending on the emission take-off angle θ measured relative to the specimen surface. Ninety-five percent of the photoelectrons detected by XPS are those emitted from a depth up to $3\lambda_j^1 \sin \theta$. The range of θ is not particularly limited as long as measurement is possible. For example, an angle of 45° is conveniently used. The depth of analysis is up to several nanometers from the specimen surface. Therefore, the atomic concentration as measured by XPS is surface atomic concentration $\Phi_{s,j}$ within a thickness ranging from the surface to a depth of several nanometers.

On the other hand, the average atomic concentration $f_j$ for element j contained in multi-component polyimide forming the whole membrane is represented by equation:

$$f_j = \Sigma m_k n_k / \Sigma m_k N_k$$

where $n_k$ is the number of atoms of element j contained in monomer k (when monomer k is a tetracarboxylic acid or an anhydride thereof, and element j is oxygen, $n_k$ is the number of oxygen atoms except the oxygen atoms released in the form of condensation water at the time of polymerization into polyimide); $N_k$ is the total number of all the XPS-detectable atoms in monomer k (when monomer k is a tetracarboxylic acid or an anhydride thereof, $N_k$ is the number of all the detectable atoms except the oxygen atoms released in the form of condensation water on polymerization to polyimide); $m_k$ is the molar fraction of monomer k in multi-component polyimide forming the membrane; and $\Sigma$ means summation of data for all the monomers k in the multi-component polyimide.

The fluorine atom concentration (f) of a membrane as a whole in the present invention is a value calculated according to the above-described equation.

A process of producing an asymmetric membrane of multi-component polyimide according to the invention and the characteristics of the resulting asymmetric membrane are then described hereunder. It should be noted that the invention is not limited to Examples hereinafter given.

Methods of measurements carried out in the invention are explained below.

(1) Preparation of Polyimide Film

A polyimide solution prepared with its solution viscosity adjusted to 50 to 1000 poise at 100° C. was filtered through a 400 mesh net and allowed to stand at 100° C. for deaeration. The resulting polyimide solution at 50° C. was cast on a glass plate using a doctor knife set at 0.5 mm or 0.2 mm clearance and heated in an oven at 100° C. for 3 hours to evaporate the solvent, and further heat treated in an oven at 300° C. for 1 hour to obtain a polyimide film as a sample for helium gas permeability coefficient measurement.

(2) Measurement of Helium Gas Permeability Coefficient ($P_{He}$), Nitrogen Gas Permeability Coefficient ($P_{N2}$), and Helium to Nitrogen Permeability Coefficient Ratio ($P_{He}/P_{N2}$)

Helium gas permeability coefficient measurement was carried out by a high-vacuum time-lag method. The polyimide film was mounted in a permeation cell. The cell was kept at 80° C. and evacuated to a high vacuum of $10^{-5}$ Torr with a vacuum pump. Helium gas was fed to the feed side of the film at a pressure of 2.5 kgf/cm², and an increase in pressure in the permeate side of the film was recorded with time. The helium gas permeability coefficient ($P_{He}$) was calculated from the thickness and effective area of the film, the volume of the permeate side, the pressure in the feed side, etc. The nitrogen gas permeability coefficient ($P_{N2}$) of the film was determined in the same manner using the same polyimide film, except for replacing helium gas with nitrogen gas. A helium to nitrogen permeability coefficient ratio ($P_{He}/P_{N2}$) was calculated from the thus obtained helium gas permeability coefficient ($P_{He}$) and nitrogen gas permeability coefficient ($P_{N2}$).

(3) Measurement of Helium Gas and Nitrogen Gas Permeation Performance of Hollow Fiber Membrane An element for permeation performance evaluation having an effective length of 10 cm was prepared using 15 hollow fiber membranes, a stainless pipe (container), and an epoxy resin adhesive. The element was put into the stainless steel container to make a pencil module. Helium gas was fed to the module under a given pressure to measure the permeate flow rate. The helium gas permeation rate was calculated from the amount of permeate helium gas, the feed pressure, and the effective membrane area. A nitrogen gas permeation rate was measured in the same manner. These measurements were taken at 80° C.

(4) Measurement of Tensile Strength and Elongation at Break of Hollow Fiber Membrane Measurements were made with a tensile tester on an effective length of 20 mm at a pulling speed of 10 mm/min at a measuring temperature of 23° C. The cross-sectional area of a hollow fiber was obtained by observing a cross-section of a hollow fiber under an optical microscope and measuring the size.

(5) Measurement of Rotational Viscosity

The solution viscosity of a polyimide solution was measured with a rotational viscometer (shear rate of rotor: 1.75 sec$^{-1}$) at 100° C.

(6) Measurement of Fluorine Atom Concentration on Dense Layer Surface by X-Ray Photoelectron Spectroscopy X-Ray photoelectron spectroscopy was carried out with Quantum 2000 Scanning ESCA Microprobe from PHI. Monochromatized AlKα rays were used as X-rays. The X-ray probe beam diameter was 20 μm. The take-off angle was 45°. A flood electron gun was used to neutralize the charges on the sample surface. The area of each of the peaks from the C 1s orbital, the N 1s orbital, the O 1s orbital, the F 1s orbital, and the S 2sp orbital was obtained after removing the background. Multipack software version 6.1A (1999) from PHI was used for processing the photoelectron peaks and calculating the atomic concentrations. A relative sensitivity $S'_j$ obtained by correcting the corresponding relative sensitivity factor $ASF_j$ supplied by PHI for each photoelectron peak by the instrumental function of the apparatus (the permeation function of the spectroscope) is shown in Table 1 below. In Table, the S values are relatively expressed taking the value for F 1s as 1.

TABLE 1

| | Photoelectron Peak | | | | |
| --- | --- | --- | --- | --- | --- |
| | C 1s | N 1s | O 1s | F s | S 2p |
| Relative Sensitivity (S') | 0.31 | 0.49 | 0.73 | 1 | 0.80 |

A homopolyimide film consisting of 6FDA and TSN and a homopolyimide film consisting of 6FDA and DABA were prepared, and the atomic concentration for every element of the polyimide was determined using $S_j$ obtained by correcting the relative sensitivity $S'_j$ ($S_j=S'_j \times \alpha_j$). The correction factor (α) used for each element is shown in Table 2 below.

TABLE 2

| | Photoelectron Peak | | | | |
| --- | --- | --- | --- | --- | --- |
| | C 1s | N 1s | O 1s | F 1s | S 2p |
| Relative Sensitivity Correction Factor (α) | 1.08 | 1.01 | 1.02 | 0.93 | 0.96 |

Reference Example 1

In a separable flask were put 12.44 g of 2,2-bis(3,4-dicarboxyphenyl)hexafluoropropane dianhydride (6FDA), 4.92 g of dimethyl-3,7-diaminodibenzothiophene 5,5-dioxide (TSN), 1.64 g of 3,5-diaminobenzoic acid (DABA), and 102 g of p-chlorophenol (PCP) as a solvent, and the system was allowed to polymerize and imidate at 190° C. for 31 hours to obtain a polyimide solution having a polymer concentration of 15 wt % and a rotational viscosity of 446 poise.

A polyimide film formed of the resulting polyimide solution had a helium gas permeability coefficient ($P_{He}$) of 1.1× 10$^{-8}$ cm³(STP)·cm/cm²·sec·cmHg and a helium to nitrogen gas permeability coefficient ratio ($P_{He}/P_{N2}$) of 37.

Reference Example 2

In a separable flask were put 1236 g of 3,3',4,4'-biphenyltetracarboxylic acid dianhydride (s-BPDA), 1135 g of TSN, and 165 g of PCP as a solvent, and the system was allowed to polymerize and imidate at 190° C. for 25 hours to obtain a polyimide solution having a polymer concentration of 11.8 wt % and a rotational viscosity of 600 poise.

A polyimide film formed of the resulting polyimide solution had a helium gas permeability coefficient ($P_{He}$) of $2.2 \times 10^{-9}$ cm$^3$(STP)·cm/cm$^2$·sec·cmHg and a helium to nitrogen gas permeability coefficient ratio ($P_{He}/P_{N2}$) of 110. The polyimide film had a to tensile strength at break of 260 MPa, a Young's modulus of 5925 MPa, and an elongation at break of 24%.

(7) Preparation of Asymmetric Hollow Fiber Membrane

The asymmetric hollow fiber membranes used in Examples were prepared by dry/wet spinning method. A polyimide solution or a polyimide blend solution was filtered through a 400 mesh net and spun through a hollow fiber spinneret (outer diameter of annular opening: 1000 μm; slit width of annular opening: 200 μm; outer diameter of core opening: 400 μm) at 71° C. The spun hollow fibers were passed through a nitrogen atmosphere and immersed in a coagulation bath of a 75 wt % ethanol aqueous solution at 0° C. The wet fibers were then immersed in ethanol at 50° C. for 2 hours to remove the solvent. The fibers were further immersed in isooctane at 70° C. for 3 hours for solvent replacement, dried at 100° C. for 30 minutes in an absolute dry condition, and heat treated at 300° to 320° C. for 1 hour. The fibers were further treated with silicone oil to improve the surface slip. The resulting individual hollow fibers had an outer diameter of around 400 μm, an inner diameter of around 200 μm, and a thickness of about 100

Example 1

In a separable flask, 12.36 g of s-BPDA and 11.35 g of TSN (0.985 parts by mole of a diamine per part by mole of an acid dianhydride; B/A=0.985) were polymerized and imidated in 165 g of PCP as a solvent at 190° C. for 22 hours to obtain a polyimide B solution having a polymer concentration of 11.8 wt %. The polyimide B was found to have a number-averaged polymerization index $N_B$ of 74 as measured by the above-described GPC method. To the polyimide solution were added 12.44 g of 6FDA, 5.21 g of TSN, 1.73 g of DABA (1.085 parts by mole of diamines per part by mole of an acid dianhydride), and 20 g of PCP as a solvent. The resulting multi-component polyimide blend solution was subjected to further polymerization and imidation at 190° C. for 8 hours to obtain a multicomponent polyimide blend solution having a rotational viscosity of 2046 poise and a polymer concentration of 18 wt %. The number-averaged polymerization index of the multicomponent polyimide was found to be 41 as measured by the above-described GPC method.

An asymmetric membrane was prepared using the resulting multicomponent polyimide blend solution. The characteristics of the asymmetric membrane were measured. The results obtained are shown in Table 3 below.

Example 2

In a separable flask, 12.36 g of s-BPDA and 11.35 g of TSN were polymerized and imidated in 169 g of PCP as a solvent at 190° C. for 27 hours to obtain a polyimide B solution having a polymer concentration of 11.6 wt %. The polyimide B was found to have a number-averaged polymerization index $N_B$ of 75 as measured by the above-described GPC method. To the polyimide solution were added 12.44 g of 6FDA, 4.17 g of TSN, 3.77 g of 3,3'-diaminodiphenyl sulfone (hereinafter sometimes abbreviated as MASN), and 20 g of PCP as a solvent. The resulting multicomponent polyimide blend solution was subjected to further polymerization and imidation at 190° C. for 8 hours to obtain a multicomponent polyimide blend solution having a rotational viscosity of 1693 poise and a polymer concentration of 18 wt %. The number-averaged polymerization index of the multicomponent polyimide was found to be 41 as measured by the above-described GPC method.

An asymmetric membrane was prepared using the multicomponent polyimide blend solution. The characteristics of the resulting asymmetric membrane were measured. The results obtained are shown in Table 3 below.

Comparative Example 1

In a separable flask, 12.71 g of s-BPDA, 12.79 g of 6FDA, 16.20 g of TSN, and 3.67 g of MASN (1.025 parts by mole of diamines per part by mole of acid dianhydrides) were polymerized and imidated in 196 g of PCP as a solvent at 190° C. for 54 hours to obtain a polyimide solution having a rotational viscosity of 1097 poise and a polymer concentration of 18 wt %. The polyimide was found to have a number-averaged polymerization index of 45 as measured by the above-described GPC method.

An asymmetric membrane was prepared using the multicomponent polyimide blend solution. The characteristics of the resulting asymmetric membrane were measured. The results obtained are shown in Table 3 below.

The composition of the raw materials used in Comparative Example 1 is nearly the same as that of Example 2, but the resulting film had $\Phi_s/f$ of 1.02 and a tensile elongation at break as low as 7%.

Example 3

In a separable flask, 6.36 g of s-BPDA, 12.79 g of 6FDA, 8.10 g of TSN, 3.67 g of MASN, and 1.12 g of DABA were polymerized and imidated in 171 g of PCP as a solvent at 190° C. for 27 hours to obtain a polyimide A solution having a polymer concentration of 15.0 wt %. The polyimide A was found to have a number-averaged polymerization index $N_A$ of 31 as measured by the above-described GPC method. To the polyimide solution were added 6.36 g of s-BPDA, 6.07 g of TSN, and 20 g of PCP as a solvent. The resulting multicomponent polyimide blend solution was subjected to further polymerization and imidation at 190° C. for 19 hours to obtain a multicomponent polyimide blend solution having a rotational viscosity of 1246 poise and a polymer concentration of 18 wt %. The number-averaged polymerization index of the multi-component polyimide was found to be 46 as a result of the above-described GPC measurement.

An asymmetric membrane was prepared using the multicomponent polyimide blend solution. The characteristics of the resulting asymmetric membrane were measured. The results obtained are shown in Table 3 below.

Example 4

In a separable flask, 12.36 g of s-BPDA and 11.35 g of TSN were polymerized and imidated in 165 g of PCP as a solvent at 190° C. for 27 hours to obtain a polyimide B solution having a polymer concentration of 11.8 wt %. The polyimide B was found to have a number-averaged polymerization index $N_B$ of 76 as measured by the above-described GPC method. To the polyimide solution were added 12.44 g of 6FDA, 2.08 g of TSN, 3.77 g of MASN, 1.16 g of DABA, and 20 g of PCP as a solvent. The resulting multi-component polyimide blend solution was subjected to further polymerization and imidation at 190° C. for 30 hours to obtain a multicomponent polyimide blend solution having a rotational viscosity of 911 poise and a polymer concentration of 18 wt %. The number-averaged polymerization index of the multi-component polyimide was 45 as measured by the above-described GPC method.

An asymmetric membrane was prepared using the multi-component polyimide blend solution. The characteristics of the resulting asymmetric membrane were measured. The results obtained are shown in Table 3 below.

Example 5

In a separable flask, 12.7 g of s-BPDA and 12.15 g of TSN were polymerized and imidated in 171 g of PCP as a solvent at 190° C. for 27 hours to obtain a polyimide B solution having a polymer concentration of 12.0 wt %. The polyimide B was found to have a number-averaged polymerization index $N_B$ of 79 as measured by the above-described GPC method. To the polyimide solution were added 12.79 g of 6FDA, 2.02 g of TSN, 3.67 g of MASN, 1.12 g of DABA, and 20 g of PCP as a solvent. The resulting multi-component polyimide blend solution was subjected to further polymerization and imidation at 190° C. for 10 hours to obtain a multicomponent polyimide blend solution having a rotational viscosity of 1767 poise and a polymer concentration of 18 wt %. The number-averaged polymerization index of the multi-component polyimide was found to be 73 as measured by the above-described GPC method.

An asymmetric membrane was prepared using the multi-component polyimide blend solution. The characteristics of the resulting asymmetric membrane were measured. The results obtained are shown in Table 3 below.

Example 6

In a separable flask, 6.36 g of s-BPDA and 6.07 g of TSN were polymerized and imidated in 171 g of PCP as a solvent at 190° C. for 27 hours to obtain a polyimide B solution having a polymer concentration of 6.4 wt %. The polyimide B was found to have a number-averaged polymerization index $N_B$ of 57 as measured by the above-described GPC method. To the polyimide solution were added 6.36 g of s-BPDA, 12.79 g of 6FDA, 8.10 g of TSN, 3.67 g of MASN, 1.12 g of DABA, and 20 g of PCP as a solvent. The resulting multi-component polyimide blend solution was subjected to further polymerization and imidation at 190° C. for 19 hours to obtain a multi-component polyimide blend solution having a rotational viscosity of 1507 poise and a polymer concentration of 18 wt %. The number-averaged polymerization index of the multi-component polyimide was found to be 50 as a result of the above-described GPC measurement.

An asymmetric membrane was prepared using the multi-component polyimide blend solution. The characteristics of the resulting asymmetric membrane were measured. The results obtained are shown in Table 3 below.

Comparative Example 2

In a separable flask, 12.71 g of s-BPDA, 12.79 g of 6FDA, 14.17 g of TSN, and 3.67 g of MASN, and 1.12 g of DABA were polymerized and imidated in 191 g of PCP as a solvent at 190° C. for 73 hours to obtain a polyimide solution having a rotational viscosity of 1190 poise and a polymer concentration of 18 wt %. The polyimide was found to have a number-averaged polymerization index of 49 as measured by the above-described GPC method.

An asymmetric membrane was prepared using the multi-component polyimide blend solution. The characteristics of the resulting asymmetric membrane were measured. The results obtained are shown in Table 3 below.

The composition of the raw materials used in Comparative Example 2 is nearly the same as that of Example 6, but the resulting film had $\Phi_s/f$ of 1.04 and a tensile elongation at break as low as 7%.

Example 7

In a separable flask, 12.44 g of 6FDA and 4.37 g of DABA were polymerized and imidated in 155 g of PCP as a solvent at 120° C. for 2 hours to obtain a polyimide A solution having a polymer concentration of 9.8 wt %. In order to determine the number-averaged polymerization index of the reaction solution, a portion of the reaction solution was cast on a slide glass and immersed in ethanol to coagulate. After PCP was thoroughly removed by solvent displacement, the film was dried in vacuo at room temperature for 5 hours to prepare a specimen for FT-IR analysis. The imidation rate was determined by the aforementioned method and found to be 0.63, from which the number-averaged polymerization index $N_A$ was calculated to be 2.7. To the polyimide solution were added 12.36 g of s-BPDA, 11.81 g of TSN, and 20 g of PCP as a solvent. The resulting multi-component polyimide blend solution was subjected to further polymerization and imidation at 190° C. for 30 hours to obtain a multi-component polyimide blend solution having a rotational viscosity of 1265 poise and a polymer concentration of 18 wt %. The number-averaged polymerization index of the multi-component polyimide was found to be 72 as a result of the above-described GPC measurement.

An asymmetric membrane was prepared using the multi-component polyimide blend solution. The characteristics of the resulting asymmetric membrane were measured. The results obtained are shown in Table 3 below.

Example 8

In a separable flask, 12.44 g of 6FDA and 4.37 g of DABA were polymerized and imidated in 155 g of PCP as a solvent at 120° C. for 1 hour to obtain a polyimide A solution having a polymer concentration of 9.8 wt %. In order to determine the number-averaged polymerization index of the reaction solution, a portion of the reaction solution was cast on a slide glass and immersed in ethanol to coagulate. After PCP was thoroughly removed by solvent displacement, the film was dried in vacuo at room temperature for 5 hours to prepare a specimen for FT-IR analysis. The imidation rate was determined by the aforementioned method and found to be 0.52, from which the number-averaged polymerization index $N_A$ was calculated and found to be 2.1.

To the polyimide solution were added 12.36 g of s-BPDA, 11.81 g of TSN, and 20 g of PCP as a solvent. The resulting multi-component polyimide blend solution was subjected to further polymerization and imidation at 190° C. for 30 hours to obtain a multi-component polyimide blend solution having a rotational viscosity of 1469 poise and a polymer concentration of 18 wt %. The number-averaged polymerization index of the multi-component polyimide was 78 as measured by the above-described GPC method.

An asymmetric membrane was prepared using the multi-component polyimide blend solution. The characteristics of the resulting asymmetric membrane were measured. The results obtained are shown in Table 3 below.

Example 9

In a separable flask, 23.10 g of 6FDA, 3.66 g of TSN, 6.62 g of MASN, and 2.03 g of DABA were polymerized and imidated in 153 g of PCP as a solvent at 190° C. for 6 hours to obtain a polyimide A solution having a polymer concentration of 18 wt %. The polyimide A had a number-averaged polymerization index $N_A$ of 4.9 as measured by the above-described GPC method.

In a separable flask, 21.18 g of s-BPDA and 20.25 g of TSN were polymerized and imidated in 177 g of PCP as a solvent at 190° C. for 6 hours to obtain a polyimide B solution having a polymer concentration of 18 wt %. The polyimide B was found to have a number-averaged polymerization index $N_B$ of 51 as measured by the above-described GPC method.

Eighty-eight grams of the polyimide A solution and 110 g of the polyimide B solution were weighed out and mixed in a separable flask. The resulting multi-component polyimide blend solution was subjected to further polymerization and imidation at 190° C. for 13 hours to obtain a multi-component polyimide blend solution having a rotational viscosity of 2232 poise and a polymer concentration of 18 wt %. The number-averaged polymerization index of the multi-component polyimide was found to be 62 by the above-described GPC method.

An asymmetric membrane was prepared using the multi-component polyimide blend solution. The characteristics of the resulting asymmetric membrane were measured. The results obtained are shown in Table 3 below.

Example 10

In a separable flask, 21.18 g of s-BPDA and 20.25 g of TSN were polymerized and imidated in 177 g of PCP as a solvent at 190° C. for 0.5 hours to obtain a polyimide B solution having a polymer concentration of 18 wt %. The polyimide B was found to have a number-averaged polymerization index $N_B$ of 6.0 as measured by the above-described GPC method.

A hundred and ten grams of the polyimide B solution and 88 g of the polyimide A solution having a number-averaged polymerization index of 4.9 which was obtained in Example 9 were weighed out and mixed in a separable flask. The resulting multi-component polyimide blend solution was subjected to further polymerization and imidation at 190° C. for 19 hours to obtain a multi-component polyimide blend solution having a rotational viscosity of 1376 poise and a polymer concentration of 18 wt %. The number-averaged polymerization index of the multicomponent polyimide was found to be 57 by the above-described GPC method.

An asymmetric membrane was prepared using the multi-component polyimide blend solution. The characteristics of the resulting asymmetric membrane were measured. The results obtained are shown in Table 3 below.

Example 11

In a separable flask, 23.10 g of 6FDA, 3.66 g of TSN, 6.62 g of MASN, and 2.03 g of DABA were polymerized and imidated in 153 g of PCP as a solvent at 190° C. for 29 hours to obtain a polyimide A solution having a polymer concentration of 18 wt %. The polyimide A had a number-averaged polymerization index $N_A$ of 22 as measured by the above-described GPC method.

In a separable flask, 21.18 g of s-BPDA and 20.25 g of TSN were polymerized and imidated in 177 g of PCP as a solvent at 190° C. for 0.25 hours to obtain a polyimide B solution having a polymer concentration of 18 wt %. The polyimide B was found to have a number-averaged polymerization index $N_B$ of 4.5 as measured by the above-described GPC method.

Eighty-eight grams of the polyimide A solution and 110 g of the polyimide B solution were weighed out and mixed in a separable flask. The resulting multi-component polyimide blend solution was subjected to further polymerization and imidation at 190° C. for 29 hours to obtain a multi-component polyimide blend solution having a rotational viscosity of 1172 poise and a polymer concentration of 18 wt %. The number-averaged polymerization index of the multi-component polyimide was found to be 45 by the above-described GPC method.

An asymmetric membrane was prepared using the multi-component polyimide blend solution. The characteristics of the resulting asymmetric membrane were measured. The results obtained are shown in Table 3 below.

Example 12

In a separable flask, 23.10 g of 6FDA, 3.66 g of TSN, 6.62 g of MASN, and 2.03 g of DABA were polymerized and imidated in 153 g of PCP as a solvent at 190° C. for 0.5 hours to obtain a polyimide A solution having a polymer concentration of 18 wt %. The polyimide A had a number-averaged polymerization index $N_A$ of 2.76 as measured by the above-described GPC method.

In a separable flask, 21.18 g of s-BPDA and 20.25 g of TSN were polymerized and imidated in 177 g of PCP as a solvent at 190° C. for 0.2 hours to obtain a polyimide B solution having a polymer concentration of 18 wt %. The polyimide B was found to have a number-averaged polymerization index $N_B$ of 3.1 as measured by the above-described GPC method.

Eighty-eight grams of the polyimide A solution and 110 g of the polyimide B solution were weighed out and mixed in a separable flask. The resulting multi-component polyimide blend solution was subjected to further polymerization and imidation at 190° C. for 19 hours to obtain a multi-component polyimide blend solution having a rotational viscosity of 1618 poise and a polymer concentration of 18 wt %. The number-averaged polymerization index of the multicomponent polyimide was found to be 78 by the above-described GPC method.

An asymmetric membrane was prepared using the multi-component polyimide blend solution. The characteristics of the resulting asymmetric membrane were measured. The results obtained are shown in Table 3 below.

Comparative Example 3

In a separable flask, 6.36 g of s-BPDA and 6.07 g of TSN were polymerized and imidated in 171 g of PCP as a solvent at 190° C. for 5 hours to obtain a polyimide B solution having a polymer concentration of 6.4 wt %. The polyimide B was found to have a number-averaged polymerization index $N_B$ of 7.4 as measured by the above-described GPC method. To the polyimide solution were added 6.36 g of s-BPDA, 12.79 g of 6FDA, 8.10 g of TSN, 3.67 g of MASN, 1.12 g of DABA, and 20 g of PCP as a solvent. The resulting multi-component polyimide blend solution was subjected to further polymerization and imidation at 190° C. for 23 hours to obtain a multi-component polyimide blend solution having a rotational viscosity of 1079 poise and a polymer concentration of 18 wt %. The number-averaged polymerization index of the multi-component polyimide was found to be 49 as a result of the above-described GPC measurement.

An asymmetric membrane was prepared using the multi-component polyimide blend solution. The characteristics of the resulting asymmetric membrane were measured. The results obtained are shown in Table 3 below.

In Comparative Example 3, the combination of $N_A$ and $N_B$ are out of the range satisfying equation 1 (i.e., in region A of FIG. 4). The film had $\Phi_s/f$ of 1.07 and a tensile elongation at break as low as 8%.

Example 13

In a separable flask, 12.36 g of s-BPDA and 11.35 g of TSN were polymerized and imidated in 158 g of PCP as a solvent at 190° C. for 30 hours to obtain a polyimide B solution having a polymer concentration of 11.8 wt %. The polyimide B was found to have a number-averaged polymerization index $N_B$ of 75 as measured by the above-described GPC method. To the polyimide solution were added 12.44 g of 6FDA, 3.77 g of MASN, 1.64 g of MPD, and 20 g of PCP as a solvent. The resulting multi-component polyimide blend solution was subjected to further polymerization and imidation at 190° C. for 6 hours to obtain a multi-component polyimide blend solution having a rotational viscosity of 1432 poise and a polymer concentration of 18 wt %. The number-averaged polymerization index of the multi-component polyimide was found to be 101 by the above-described GPC method.

An asymmetric membrane was prepared using the multi-component polyimide blend solution. The characteristics of the resulting asymmetric membrane were measured. The results obtained are shown in Table 3.

Comparative Example 4

In a separable flask, 21.32 g of 6FDA, 8.44 g of TSN, 2.81 g of DABA were polymerized and imidated in 129 g of PCP as a solvent at 190° C. for 40 hours to obtain a polyimide A solution having a polymer concentration of 19.3 wt %. The polyimide A had a number-averaged polymerization index $N_A$ of 26 as measured by the above-described GPC method.

In a separable flask, 27.41 g of s-BPDA, 22.22 g of TSN, and 1.80 g of DADE were polymerized and imidated in 210 g of PCP as a solvent at 190° C. for 40 hours to obtain a polyimide B solution having a polymer concentration of 18.7 wt %. The polyimide B was found to have a number-averaged polymerization index $N_B$ of 47 as measured by the above-described GPC method.

Ninety grams of the polyimide A solution and 100 g of the polyimide B solution were weighed out and mixed in a separable flask. The resulting multi-component polyimide blend solution was subjected to further polymerization and imidation at 190° C. for 3 hours to obtain a multi-component polyimide blend solution having a rotational viscosity of 1711 poise and a polymer concentration of 19 wt %. The number-averaged polymerization index of the multi-component polyimide was found to be 52 by the above-described GPC method.

An asymmetric membrane was prepared using the multi-component polyimide blend solution. The characteristics of the resulting asymmetric membrane were measured. The results obtained are shown in Table 3.

In Comparative Example 4, the combination of $N_A$ and $N_B$ are out of the range satisfying equation 1 (i.e., in region B of FIG. 4). The film had $\Phi_s/f$ of 1.82. The ratio of a hydrogen gas permeation rate $(H_{H2})$ to a nitrogen gas permeation rate $(P'_{N2})$, i.e., $P'_{H2}/P'_{N2}$, was 11.

Comparative Example 5

In a separable flask, 26.65 g of 6FDA, 10.49 g of TSN, and 3.49 g of DABA were polymerized and imidated in 161 g of PCP as a solvent at 190° C. for 40 hours to obtain a polyimide A solution having a polymer concentration of 19.3 wt %. The polyimide A had a number-averaged polymerization index $N_A$ of 44 as measured by the above-described GPC method.

In a separable flask, 52.66 g of s-BPDA, 46.00 g of TSN, and 3.73 g of DADE were polymerized and imidated in 419 g of PCP as a solvent at 190° C. for 25 hours to obtain a polyimide B solution having a polymer concentration of 18.7 wt %. The polyimide B was found to have a number-averaged polymerization index $N_B$ of 66 as measured by the above-described GPC method.

Ninety grams of the polyimide A solution and 100 g of the polyimide B solution were weighed out and mixed in a separable flask. The resulting multi-component polyimide blend solution was stirred at 130° C. for 3 hours to prepare a multicomponent polyimide blend solution having a rotational viscosity of 2753 poise and a polymer concentration of 19 wt %. The number-averaged polymerization index of the multi-component polyimide was found to be 56 by the above-described GPC method.

An asymmetric membrane was prepared using the multi-component polyimide blend solution. The characteristics of the resulting asymmetric membrane were measured. The results obtained are shown in Table 3.

In Comparative Example 5, the combination of $N_A$ and $N_B$ are out of the range satisfying equation 1 (i.e., in region B of FIG. 4), and the two polyimide solutions were merely mixed with no substantial imidation reaction. The $\Phi_s/f$ value was 2.06, and the hydrogen gas permeation rate $(P'_{H2})$ to nitrogen gas permeation rate $(P'_{N2})$ ratio, i.e., $P'_{H2}/P'_{N2}$, was 3.

TABLE 3

| | Multi-component Polyimide Blend solution | | | | | | |
|---|---|---|---|---|---|---|---|
| | Polyimide A | | Polyimide B | | Total Monomer | Number-Avg. Polymerization Degree | | Solution Viscosity |
| | Monomer Component | $N_A$ | Monomer Component | $N_B$ | Composition | After Step 1 | After Step 2 | (Polymer Concn.) |
| Example 1 (SY4-9) | 6FDA 12.44 g TSN 5.21 g | 0.5 | s-BPDA 12.36 g | 74 | s-BPDA 12.36 g | 1.2 | 41 | 2046 poise (18 wt %) |

TABLE 3-continued

|  |  |  |  |  |  |  |  |
|---|---|---|---|---|---|---|---|
|  | DABA 1.73 g (B/A = 1.085) |  | TSN 11.35 g (B/A = 0.985) |  | 6FDA 12.44 g TSN 16.56 g DABA 1.73 g (B/A = 1.025) |  |  |
| Example 2 (SY4-25) | 6FDA 12.44 g TSN 4.17 g MASN 3.77 g (B/A = 1.085) | 0.5 | s-BPDA 12.36 g TSN 11.35 g (B/A = 0.985) | 75 | s-BPDA 12.36 g 6FDA 12.44 g TSN 15.52 g MASN 3.77 g (B/A = 1.025) | 1.2 | 41 | 1693 poise (18 wt %) |
| Example 3 (SY4-23) | s-BPDA 6.36 g 6FDA 12.79 g TSN 8.10 g MASN 3.67 g DABA 1.12 g (B/A = 1.025) | 31 | s-BPDA 6.36 g TSN 6.07 g (B/A = 1.025) | 0.5 | s-BPDA 12.72 g 6FDA 12.79 g TSN 14.17 g MASN 3.67 g DABA 1.12 g (B/A = 1.025) | 1.6 | 46 | 1246 poise (18 wt %) |
| Example 4 (SY4-28) | 6FDA 12.44 g TSN 2.08 g MASN 3.77 g DABA 1.16 g (B/A = 1.085) | 0.5 | s-BPDA 12.36 g TSN 11.35 g (B/A = 0.985) | 76 | s-BPDA 12.36 g 6FDA 12.44 g TSN 13.43 g MASN 3.77 g DABA 1.16 g (B/A = 1.025) | 1.2 | 45 | 911 poise (18 wt %) |
| Example 5 (SY4-21) | 6FDA 12.79 g TSN 2.02 g MASN 3.67 g DABA 1.12 g (B/A = 1.025) | 0.5 | s-BPDA 12.71 g TSN 12.15 g (B/A = 1.025) | 79 | s-BPDA 12.71 g 6FDA 12.79 g TSN 14.17 g MASN 3.67 g DABA 1.12 g (B/A = 1.025) | 1.2 | 73 | 1767 poise (18 wt %) |
| Example 6 (SY4-22) | s-BPDA 6.36 g 6FDA 12.79 g TSN 8.10 g MASN 3.67 g DABA 1.12 g (B/A = 1.025) | 0.5 | s-BPDA 6.36 g TSN 6.07 g (B/A = 1.025) | 57 | s-BPDA 12.72 g 6FDA 12.79 g TSN 14.17 g MASN 3.67 g DABA 1.12 g (B/A = 1.025) | 0.7 | 50 | 1507 poise (18 wt %) |
| Example 7 (TY3-4-7) | 6FDA 12.44 g DABA 4.37 g (B/A = 1.025) | 2.7 | s-BPDA 12.36 g TSN 11.81 g (B/A = 1.025) | 0.5 | s-BPDA 12.36 g 6FDA 12.44 g TSN 11.81 g DABA 4.37 g (B/A = 1.025) | 0.7 | 72 | 1265 poise (18 wt %) |
| Example 8 (TY3-6-7) | 6FDA 12.44 g DABA 4.37 g (B/A = 1.025) | 2.1 | s-BPDA 12.36 g TSN 11.81 g (B/A = 1.025) | 0.5 | s-BPDA 12.36 g 6FDA 12.44 g TSN 11.81 g DABA 4.37 g (B/A = 1.025) | 0.7 | 78 | 1469 poise (18 wt %) |
| Example 9 (SY5-16) | 6FDA 10.86 g TSN 1.72 g MASN 3.11 g DABA 0.95 g (B/A = 1.025) | 4.9 | s-BPDA 10.79 g TSN 10.31 g (B/A = 1.025) | 51 | s-BPDA 10.79 g 6FDA 10.86 g TSN 12.03 g MASN 3.11 g DABA 0.95 g (B/A = 1.025) | 10.7 | 62 | 2232 poise (18 wt %) |
| Example 10 (SY5-17) | 6FDA 10.86 g TSN 1.72 g MASN 3.11 g DABA 0.95 g (B/A = 1.025) | 4.9 | s-BPDA 10.79 g TSN 10.31 g (B/A = 1.025) | 6.0 | s-BPDA 10.79 g 6FDA 10.86 g TSN 12.03 g MASN 3.11 g DABA 0.95 g (B/A = 1.025) | 5.51 | 57 | 1376 poise (18 wt %) |
| Example 11 (SY5-18) | 6FDA 10.86 g TSN 1.72 g MASN 3.11 g DABA 0.95 g (B/A = 1.025) | 22 | s-BPDA 10.79 g TSN 10.31 g (B/A = 1.025) | 4.5 | s-BPDA 10.79 g 6FDA 10.86 g TSN 12.03 g MASN 3.11 g DABA 0.95 g (B/A = 1.025) | 6.60 | 45 | 1172 poise (18 wt %) |
| Example 12 (SY5-19) | 6FDA 10.86 g TSN 1.72 g MASN 3.11 g DABA 0.95 g (B/A = 1.025) | 2.76 | s-BPDA 10.79 g TSN 10.31 g (B/A = 1.025) | 3.1 | s-BPDA 10.79 g 6FDA 10.86 g TSN 12.03 g MASN 3.11 g DABA 0.95 g (B/A = 1.025) | 2.97 | 78 | 1618 poise (18 wt %) |
| Example 13 | 6FDA 12.44 g MASN 3.77 g | 0.5 | s-BPDA 12.36 g | 75 | s-BPDA 12.36 g | 1.24 | 101 | 1432 poise (18 wt %) |

TABLE 3-continued

| | | | | | | |
|---|---|---|---|---|---|---|
| (SY5-21) | MPD 1.64 g (B/A = 1.085) | | TSN 11.35 g (B/A = 0.985) | | 6FDA 12.44 g TSN 11.35 g MASN 3.77 g DABA 1.64 g (B/A = 1.025) | |
| COMPARATIVE EXAMPLE 1 (SY4-27) | | | s-BPDA 12.71 g 6FDA 12.79 g TSN 16.20 g MASN 3.67 g (B/A = 1.025) | | | 45 | 1097 poise (18 wt %) |
| COMPARATIVE EXAMPLE 2 (SY4-19) | | | s-BPDA 12.71 g 6FDA 12.79 g TSN 14.17 g MASN 3.67 g DABA 1.12 g (B/A = 1.025) | | | 49 | 1190 poise (18 wt %) |
| COMPARATIVE EXAMPLE 3 (SY5-14) | s-BPDA 6.36 g 6FDA 12.79 g TSN 8.10 g MASN 3.67 DABA 1.12 g (B/A = 1.025) | 0.5 | s-BPDA 6.36 g TSN 6.07 g (B/A = 1.025) | 7.4 | s-BPDA 12.72 g 6FDA 12.79 g TSN 14.17 g MASN 3.67 g DABA 1.12 g (B/A = 1.025) | 0.7 | 49 | 1079 poise (18 wt %) |
| COMPARATIVE EXAMPLE 4 (SY5-11) | 6FDA 12.22 g TSN 4.84 g DABA 1.61 g (B/A = 1.025) | 26 | s-BPDA 10.71 g TSN 8.68 g DADE 0.70 (B/A = 0.966) | 47 | s-BPDA 10.71 g 6FDA 12.22 g TSN 13.52 g DADE 0.70 DABA 1.61 g (B/A = 0.99) | 36 | 52 | 1711 poise (19 wt %) |
| COMPARATIVE EXAMPLE 5 (SY5-1) | 6FDA 12.24 g TSN 4.82 g DABA 1.60 g (B/A = 1.025) | 44 | s-BPDA 10.38 g TSN 9.02 g DADE 0.73 g (B/A = 1.035) | 66 | s-BPDA 10.38 g 6FDA 12.24 g TSN 13.84 g DADE 0.73 g DABA 1.60 g (B/A = 1.029) | 55 | 56 | 2753 poise (19 wt %) |

| | | | Results of Evaluation of Asymmetric Membrane | | | | | |
|---|---|---|---|---|---|---|---|---|
| | | | Tensile Elongation at Break (%) | Gas Permeation Rate ($cm^3$(STP)$cm^2 \cdot sec \cdot cmHg$) | | | | | |
| | | $\Phi_s/f$ | | $P'H_2 \times 10^{-4}$ | $P'He \times 10^{-4}$ | $P'N_2 \times 10^{-5}$ | $P'O_2 \times 10^{-5}$ | $P'CO_2 \times 10^{-5}$ | $P'CH_4 \times 10^{-5}$ |
| | Example 1 (SY4-9) | 1.43 | 38 | 5.49 | 5.81 | 0.92 | 3.61 | 11.7 | 0.66 |
| | Example 2 (SY4-25) | 1.48 | 47 | 9.66 | 9.89 | 2.49 | | | |
| | Example 3 (SY4-23) | 1.18 | 16 | 8.33 | 8.48 | 1.32 | | | |
| | Example 4 (SY4-28) | 1.53 | 32 | 8.01 | 8.15 | 1.65 | | | |
| | Example 5 (SY4-21) | 1.55 | 37 | 6.37 | 6.41 | 0.88 | | | |
| | Example 6 (SY4-22) | 1.16 | 26 | 7.02 | 7.10 | 0.93 | | | |
| | Example 7 (TY3-4-7) | 1.37 | 25 | 4.74 | 4.7 | 0.65 | | | |
| | Example 8 (TY3-6-7) | 1.48 | 15 | 60.5 | 6.1 | 1.03 | | | |
| | Example 9 (SY5-16) | 1.69 | 33 | 8.59 | 8.76 | 1.67 | | | |
| | Example 10 (SY5-17) | 1.33 | 42 | 5.54 | 5.54 | 0.83 | | | |
| | Example 11 (SY5-18) | 1.58 | 25 | 6.92 | 7.0 | 0.92 | | | |
| | Example 12 (SY5-19) | 1.19 | 23 | 5.81 | 5.82 | 0.91 | | | |
| | Example 13 (SY5-21) | 1.66 | 48 | 6.99 | 7.07 | 0.81 | | | |
| | COMPARATIVE EXAMPLE 1 (SY4-27) | 1.02 | 7 | 6.01 | 6.04 | 1.21 | | | |
| | COMPARATIVE EXAMPLE 2 (SY4-19) | 1.04 | 7 | 8.10 | 8.24 | 1.11 | | | |
| | COMPARATIVE | 1.07 | 8 | 7.4 | 7.52 | 1.00 | | | |

TABLE 3-continued

| | | | | | |
|---|---|---|---|---|---|
| EXAMPLE 3 (SY5-14) | | | | | |
| COMPARATIVE EXAMPLE 4 (SY5-11) | 1.82 | 73 | 1.57 | 1.34 | 1.48 |
| COMPARATIVE EXAMPLE 5 (SY5-1) | 2.06 | 36 | 1.42 | 1. | 4.51 |

Note:
B/A indicates molar ratio of diamine component(s) to tetracarboxylic acid component
B/A indicates molar ratio of diamine component(s) to tetracarboxylic acid component(s).

INDUSTRIAL APPLICABILITY

The present invention provides a polyimide asymmetric membrane having a dense layer and a porous layer which is made of multi-component polyimide containing a fluorine-containing polyimide and has a properly controlled composition of the fluorine-containing polyimide in its dense layer.

The polyimide asymmetric membrane of the invention is suited for use as a practical high-performance gas separation membrane, with which separation between hydrogen gas and a hydrocarbon gas such as methane, separation between hydrogen and nitrogen, separation between helium and nitrogen, separation between carbonic acid gas and a hydrocarbon gas such as methane, and separation between oxygen and nitrogen, and so forth can be accomplished advantageously.

The invention claimed is:

1. A polyimide asymmetric membrane having a dense layer and a porous layer,
the membrane comprising a fluorine-containing polyimide and a fluorine-free polyimide, the dense layer containing a higher fraction of fluorine-containing polyimide, the ratio of the dense layer's fluorine atom concentration ($\Phi_s$), measured by X-ray photoelectron spectroscopy (XPS), to the overall average fluorine atom concentration (f) of the membrane, $\Phi_s/f$ ranging from 1.1 to 1.8, wherein microphase-separation occurs in the dense layer without being accompanied by macrophase-separation.

2. A gas separation membrane comprising the polyimide asymmetric membrane of claim 1.

3. The gas separation membrane according to claim 2 which is a hollow fiber membrane having a hydrogen gas permeation rate ($P'_{H2}$) of $4.0 \times 10^{-4}$ cm$^3$(STP)/cm$^2$·sec·cmHg or greater, a hydrogen gas permeation rate ($P'_{H2}$) to nitrogen gas permeation rate ($P'_{N2}$) ratio, $P'_{H2}/P'_{N2}$, of 20 or greater, and a hollow fiber tensile elongation at break of 15% or more.

4. The gas separation membrane according to claim 2 which is a hollow fiber membrane having a helium gas permeation rate ($P'_{He}$) of $4.0 \times 10^{-4}$ cm$^3$(STP)/cm$^2$·sec·cmHg or greater, a helium gas permeation rate ($P'_{He}$) to nitrogen gas permeation rate ($P'_{N2}$) ratio, $P'_{He}/P'_{N2}$, of 20 or greater, and a hollow fiber tensile elongation at break of 15% or more.

5. A method of selectively separating and recovering at least one kind of gas from a mixed gas, comprising feeding the mixed gas to a feed side of the gas separation membrane of claim 2 and selectively passing the at least one kind of gas of the mixed gas through the gas separation membrane to a permeate side of the gas separation membrane.

* * * * *